United States Patent
Chung et al.

(10) Patent No.: US 8,583,483 B2
(45) Date of Patent: Nov. 12, 2013

(54) ONLINE PLATFORM FOR WEB ADVERTISEMENT COMPETITION

(75) Inventors: Wook Chung, Kirkland, WA (US); Pritesh Patwa, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 12/785,175

(22) Filed: May 21, 2010

(65) Prior Publication Data

US 2011/0288928 A1    Nov. 24, 2011

(51) Int. Cl.
*G06Q 30/00* (2012.01)
(52) U.S. Cl.
USPC ............... 705/14.42; 705/14.41; 705/14.4
(58) Field of Classification Search
USPC ................................ 705/14.42, 14.41, 14.4
See application file for complete search history.

(56) References Cited

U.S. PATENT DOCUMENTS

| | | | |
|---|---|---|---|
| 7,304,982 | B2 | 12/2007 | Hondo et al. |
| 7,778,872 | B2 | 8/2010 | Kamangar et al. |
| 7,778,874 | B1 | 8/2010 | Saunders |
| 7,818,208 | B1 | 10/2010 | Veach |
| 7,827,060 | B2 | 11/2010 | Wright et al. |
| 8,065,184 | B2 | 11/2011 | Wright et al. |
| 8,175,914 | B1 | 5/2012 | Benson et al. |
| 2004/0044571 | A1 | 3/2004 | Bronnimann |
| 2004/0068460 | A1 | 4/2004 | Feeley et al. |
| 2004/0267612 | A1 | 12/2004 | Veach |
| 2005/0049919 | A1 | 3/2005 | Disterdick |
| 2005/0076017 | A1 | 4/2005 | Rein et al. |
| 2005/0097024 | A1 | 5/2005 | Rainey |
| 2005/0144065 | A1 | 6/2005 | Calabria et al. |
| 2006/0026064 | A1* | 2/2006 | Collins ........................... 705/14 |
| 2006/0212448 | A1 | 9/2006 | Bogle et al. |
| 2007/0016473 | A1 | 1/2007 | Anderson |
| 2007/0027762 | A1 | 2/2007 | Collins |
| 2007/0027765 | A1* | 2/2007 | Collins et al. ................... 705/14 |
| 2007/0050250 | A1 | 3/2007 | Abulhasan |
| 2007/0083885 | A1 | 4/2007 | Harding |
| 2008/0010144 | A1 | 1/2008 | Chatwin |
| 2008/0052154 | A1 | 2/2008 | Gulliksen |
| 2008/0140530 | A1 | 6/2008 | Van Luchene et al. |
| 2008/0249850 | A1 | 10/2008 | Szybalski et al. |
| 2008/0249853 | A1 | 10/2008 | Dekel et al. |
| 2008/0270164 | A1 | 10/2008 | Kidder et al. |
| 2008/0313281 | A1 | 12/2008 | Scheidl et al. |

(Continued)

FOREIGN PATENT DOCUMENTS

WO    WO 97/21183    *    7/1997    ............ G06F 151/00

OTHER PUBLICATIONS

Non-Final Office Action in U.S. Appl. No. 12/769,406 mailed Jun. 18, 2012, pp. 1-30.

(Continued)

*Primary Examiner* — John G Weiss
*Assistant Examiner* — Sam Refai
(74) *Attorney, Agent, or Firm* — Shook Hardy & Bacon L.L.P.

(57) ABSTRACT

Embodiments discussed herein relate to creating and managing competitive campaigns for advertisement spaces on a web page. Competitive campaigns may take several forms, including boosting bids for advertisements to try an match the competitor's advertisement bids in an online auction, dynamically replacing the entity's advertisement being shown, or out-and-out refusing to show an advertisement whenever the competitor's advertisement is also shown.

9 Claims, 13 Drawing Sheets

(56) References Cited

U.S. PATENT DOCUMENTS

| | | | |
|---|---|---|---|
| 2009/0094108 A1 | 4/2009 | Bhandari et al. | |
| 2009/0099916 A1 | 4/2009 | Garbow et al. | |
| 2009/0164300 A1 | 6/2009 | Gupta et al. | |
| 2009/0198551 A1 | 8/2009 | Selinger | |
| 2009/0265243 A1 | 10/2009 | Karassner et al. | |
| 2009/0313120 A1 | 12/2009 | Ketchum | |
| 2010/0082474 A1* | 4/2010 | Beaumont | 705/37 |
| 2010/0211432 A1 | 8/2010 | Yiu et al. | |
| 2010/0262455 A1 | 10/2010 | Karlsson et al. | |
| 2010/0262497 A1 | 10/2010 | Karlsson | |
| 2010/0262499 A1 | 10/2010 | Karlsson et al. | |
| 2011/0035273 A1* | 2/2011 | Parikh et al. | 705/14.42 |
| 2011/0054960 A1 | 3/2011 | Bhatia et al. | |
| 2011/0071909 A1* | 3/2011 | Ghosh et al. | 705/14.71 |
| 2011/0196746 A1 | 8/2011 | Tang et al. | |

OTHER PUBLICATIONS

Kauffman, et al., "Bid Together, Buy Together: On the Efficacy of Group-Buying Business Models in Internet-Based Selling"; Published May 16, 2001; 44 pages; http://misrc.umn.edu/wpaper/WorkingPapers/kw_echandbook_51601.pdf.

O'Brien, "Cooperative Commerce—Group buying engines promise consumers strength in numbers"; Published May 1, 2000; Computer Shopper; 2 pages; http://www.highbeam.com/doc/1G1-60962940,html.

Non-Final Office Action mailed Jun. 18, 2012 regarding U.S. Appl. No. 12/769,406 17 pages.

Non-Final Office Action mailed Apr. 17, 2013 regarding U.S. Appl. No. 12/769,406 18 pages.

Final Office Action mailed Nov. 21, 2012 in U.S. Appl. No. 12/769,406; 39 pages.

* cited by examiner

ONLINE PLATFORM FOR WEB ADVERTISEMENT COMPETITION

CROSS-REFERENCE TO RELATED APPLICATIONS

This application is related to U.S. application Ser. No. 12/769,406, filed on Apr. 28, 2010 and entitled "ONLINE PLATFORM FOR WEB ADVERTISEMENT PARTNERSHIPS".

BACKGROUND

The proliferation of the World Wide Web has made it a lucrative frontier for advertising. Web pages receiving thousands or millions of visitors are proving to be viable advertising platforms. Banner ads, sky-scraper ads, and other interactive online ads provide the web page purveyors with substantial revenue streams and act as gateways to advertisers' products, services, and web sites. As different media quickly moves to the Internet, advertisers have proven that their advertisements will follow.

Advertisers are usually forced to compete for web advertisement spaces through metrics like click through rates (CTRs), bid keywords, bid amounts, advertisement and campaign designs. These traditional metrics do not allow advertisers the ability to specifically target the advertisements of competitors for potential advertisement-display opportunities.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments are generally directed towards creating competitive campaigns that display advertisements in web ad spaces only when a competitor also displays its advertisement. The competitive campaigns give an advertiser the opportunity to key on different user-profile metrics being targeted by competitors or go head-to-head in online advertising with a competitor by making sure the advertiser's advertisement is shown on the same page a competitor's advertisement. Competitive campaigns can be created to increase bid amounts the advertiser is willing to pay for ad spaces to equal or come close to bid amounts of competitors, thus positioning the advertiser close to the competitor in an online auction.

Another aspect is directed towards an online advertisement service that optimizes the amount of money generated from advertisements by conducting several advertisement auctions that rank and select the highest-paying or highest opportunity-cost generating advertisement campaigns, co-campaigns, and/or competitive campaigns. Once a primary auction ranks a first set of advertisements and selects an optimal combination, a secondary auction—or auctions—are conducted to determine whether the advertisements can be replaced by advertisements in competitive campaigns that are triggered by competitors' advertisements being selected for the optimal combination. If the alternative advertisements from the competitive campaigns would generate a better return or higher relevancy for the advertisement service, the optimal combination may be modified accordingly.

BRIEF DESCRIPTION OF THE SEVERAL VIEWS OF THE DRAWINGS

Illustrative embodiments of the present invention are described in detail below with reference to the attached drawing figures.

DETAILED DESCRIPTION

Figure 1:
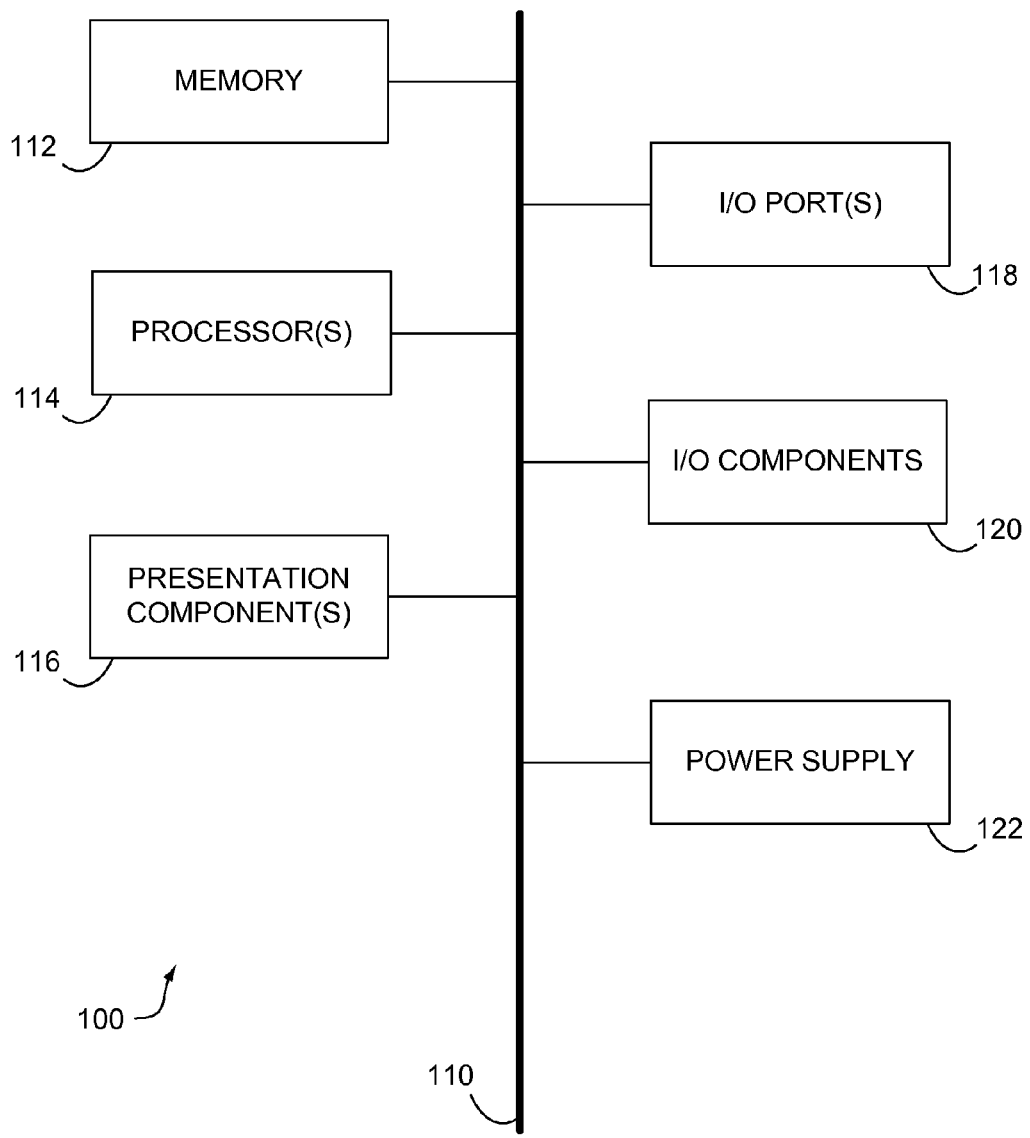
FIG. 1 illustrates an exemplary computing device, according to one embodiment.

The subject matter of embodiments of the present invention is described with specificity herein to meet statutory requirements. Although the terms "step," "block" or "module" might be used to connote different components of embodiments described herein, these terms should not be interpreted as implying any particular sequential order between various steps, unless the order of individual steps is explicitly described.

Some embodiments described herein generally relate to creating and managing advertisement co-campaigns between multiple advertisers. The embodiments allow multiple advertisers to partner together in an online effort to either's web advertisement campaigns, to create a collaborative web advertisement, or share user-profile metrics of current online advertisement campaigns. In particular, a company may desire to help the chances that another company's web advertisement is displayed to users because the former's products and services are included in the latter's products or services. For example, a software provider may have an interest in seeing a computer manufacturer sell more of its computers because the computers are pre-installed with the software company's operating system (OS). Or, to further illustrate the point, a company making a particular cell phone may want to help a cell phone service provider sign up new subscribers because the company exclusively sells its phones through the cell phone provider. Other types of advertising partnerships are also possible.

To clarify the embodiments described here, a number of terms should be defined. First, an "advertiser" refers to any company, organization, or individual looking to display advertisements on web pages, which include can include results pages of search engines. Typically, advertisers, or agents acting on their behalf, will register with and use different advertising web services (e.g., Microsoft® AdCenter or AdExpert, Google® AdSense or AdWords, and the like) to identify areas on web pages for displaying the advertiser's web advertisements, and also when to display the web advertisements—i.e., when a particular type of user views the web page, searches for a particular query on a search engine, etc.

The advertisement web services may consider various user-profile metrics in selecting web advertisement to display on which web page and to which user. While not an exhaustive list, these metrics may include: click-thru rates (CTR), bid amounts, advertisement designs and layouts, viewers' ages, viewers' locations, viewers' genders, viewers' races, viewers' web histories, and other types of viewer engagement parameters. Viewer locations can be ascertained in any number of well-known ways, such as cell phone triangulation, reverse Internet Protocol (IP) address lookup, global positioning system (GPS), or the like. Click-thru rates may include the number or percentage of times a user or group of users selects—or "clicks"—a particular web advertisement. Viewers' web histories include the tracking of web pages that a user or group of users has historically visited and or the viewers' search query history on a particular search engine.

A "campaign," as referred to herein, is a specific, predefined set of advertising metrics and their association with a web advertisement of an advertiser. For example, advertiser A may register with a web advertising service to only display a particular web advertisement to users that fit a profile of metrics the advertiser wishes to reach. In other words, the advertiser selects the advertisement and the metrics making up the profile of the users to show the advertisement to on the web page.

A "co-campaign," as referred to herein, is a campaign being run by two or more advertisers. In one embodiment, a co-campaign consists of one advertiser adding money to the bid amounts of another company's campaign. For example, Microsoft® may wish to form a co-campaign with Hewlett Packard®, because Hewlett Packard® computers are pre-installed with the latest version of Microsoft Windows®. In this embodiment, Microsoft® can form a co-campaign with Hewlett Packard® and simply add to the current bid amounts Hewlett Packard® is willing to pay in one or more campaigns for Hewlett Packard® web advertisements. For instance, if Hewlett Packard® was willing to pay X dollars to display a web advertisement on a particular web page to users of a certain profile, Microsoft® could pay Y dollars to the bid amount, resulting in an X+Y dollar bid amount. In effect, the Microsoft® contribution to the Hewlett Packard® bid amount will increase the chances that the Hewlett Packard web advertisement is selected by a web advertisement service for display. Consequently, Microsoft® would indirectly benefits because a product with Windows® has been given a better chance for advertisement exposure.

Campaigns and co-campaigns may compete in auction-based or display-based advertisement platforms. The former contemplates a plethora of advertisers—or combinations of advertisers—competing for advertisement spaces on a web page primarily through bid amounts. The latter, on the other hand, uses online display advertisements (e.g., banner, picture, or video advertisements) that are mostly based on time-table bookings, meaning the advertisements purchased by the impression or click-thru rate instead of through a bid-amount auction. In other words, an advertiser may elect to run an advertisement campaign with the display advertisements for a set number of impressions during a particular time frame (e.g., day, hour, etc.) on a particular web page.

Other embodiments described herein generally relate to creating and managing competitive campaigns that allow an advertiser in a campaign, or multiple partner advertisers in a co-campaign, to target competitors for the display of the advertiser's advertisements. In one embodiment, the advertiser can create a competitive advertisement campaign (referred to herein as a "competitive campaign") that seeks to only display the advertiser's advertisement when a designated competitive advertiser displays its own advertisement. Competitive campaigns may also enable advertisers to change the advertisements shown on a web page based on whether a competitor's advertisement is also being displayed on the web page. Alternatively or additionally, advertisers may specify to not display their advertisements, or specific advertisements, when a competitor's advertisement is also being displayed. Numerous other variations of competitive campaigns may also employ and are more specifically discussed below.

In particular, a competitive campaign is a campaign or co-campaign that includes one or more competitive conditions for displaying an advertisement. The competitive conditions are rules for displaying an advertisement. Examples include displaying an advertisement when a competitive entity's advertisement is also selected for display, changing an advertisement whenever the competitor's advertisement is displayed, or not displaying an advertisement whenever the competitor's advertisement is displayed. Also, the competitive conditions may stipulate that the advertisement should only be displayed next to the competitor's advertisement, and if that is not possible, do not display the advertisement.

Before proceeding further, one more definition should be mentioned. A "landing page," as referred to herein, is a web page or web location that a user is directed to upon selection of web advertisement. For example, a web ad for Microsoft Windows® may lead to a landing page at http://www.microsoft.com/windows. In one embodiment, a landing page is crawled, indexed, and compared to the landing page of a competitor advertiser's advertisement to determine a relevancy score between the two landing pages. The relevancy score may be based on a number of heuristics including frequency of similar text, emphasis of certain text, image recognition, optical character recognition (OCR), or other heuristics used to determine how relevant the two landing pages are to each other.

Embodiments mentioned herein may take the form of a computer-program product that includes computer-useable instructions embodied on one or more computer-readable media. Computer-readable media include both volatile and nonvolatile media, removable and nonremovable media, and contemplate media readable by a database. The various computing devices, application servers, and database servers described herein each may contain different types of computer-readable media to store instructions and data. Additionally, these devices may also be configured with various applications and operating systems.

By way of example and not limitation, computer-readable media comprise computer-storage media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read-only memory (ROM), electrically erasable programmable read-only memory (EEPROM), flash memory used independently from or in conjunction with different storage media, such as, for example, compact-disc read-only memory (CD-ROM), digital versatile discs (DVD), holographic media or other optical disc storage, magnetic cassettes, magnetic tape, magnetic disk storage, or other magnetic storage devices. These memory devices can store data momentarily, temporarily, or permanently.

Various techniques are performed by web-based services that support interoperable machine-to-machine interaction over a network. For the sake of clarity, the server-based web services described herein are referred to as "components." Components may operate in a client-server relationship to carry out various techniques described herein. Such computing is commonly referred to as "in-the-cloud" computing. To support components, servers may be configured with a server-based OS.

Having briefly described a general overview of the embodiments described herein, an exemplary operating environment is described below. Referring initially to FIG. 1 in particular, an exemplary operating environment for implementing one embodiment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of illustrated component parts. In one embodiment, computing device 100 is a personal computer. But in other embodiments, computing device 100 may be a cell phone, smart phone, digital phone, handheld device, BlackBerry®, personal digital assistant (PDA), or other device capable of executing computer instructions.

Embodiments may be described in the general context of computer code or machine-useable instructions, including computer-executable instructions such as program modules, being executed by a computer or other machine, such as a PDA or other handheld device. Generally, machine-useable instructions define various software routines, programs, objects, components, data structures, remote procedure calls (RPCs), and the like. In operation, these instructions perform particular computational tasks, such as requesting and retrieving information stored on a remote computing device or server.

Embodiments described herein may be practiced in a variety of system configurations, including handheld devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation device 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various hardware is often not so clear, and metaphorically, the lines would more accurately be grey and fuzzy. For example, one may consider a presentation device, such as a monitor, to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 may include a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation device 116 presents data indications to a user or other device. Exemplary presentation components include a display device, speaker, printing component, vibrating component, etc.

Specifically, memory 112 may be embodied with instructions for a web browser application, such as Microsoft Internet Explorer®. One skilled in the art will understand the functionality of web browsers; therefore, web browsers need not be discussed at length herein. It should be noted, however, that the web browser embodied on memory 112 may be configured with various plug-ins (e.g., Microsoft SilverLight™ or Adobe Flash). The plug-ins enable web browsers to execute various scripts or mark-up language in communicated web content. For example, a JavaScript may be embedded within a web page and executable on the client computing device 100 by a web browser plug-in.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
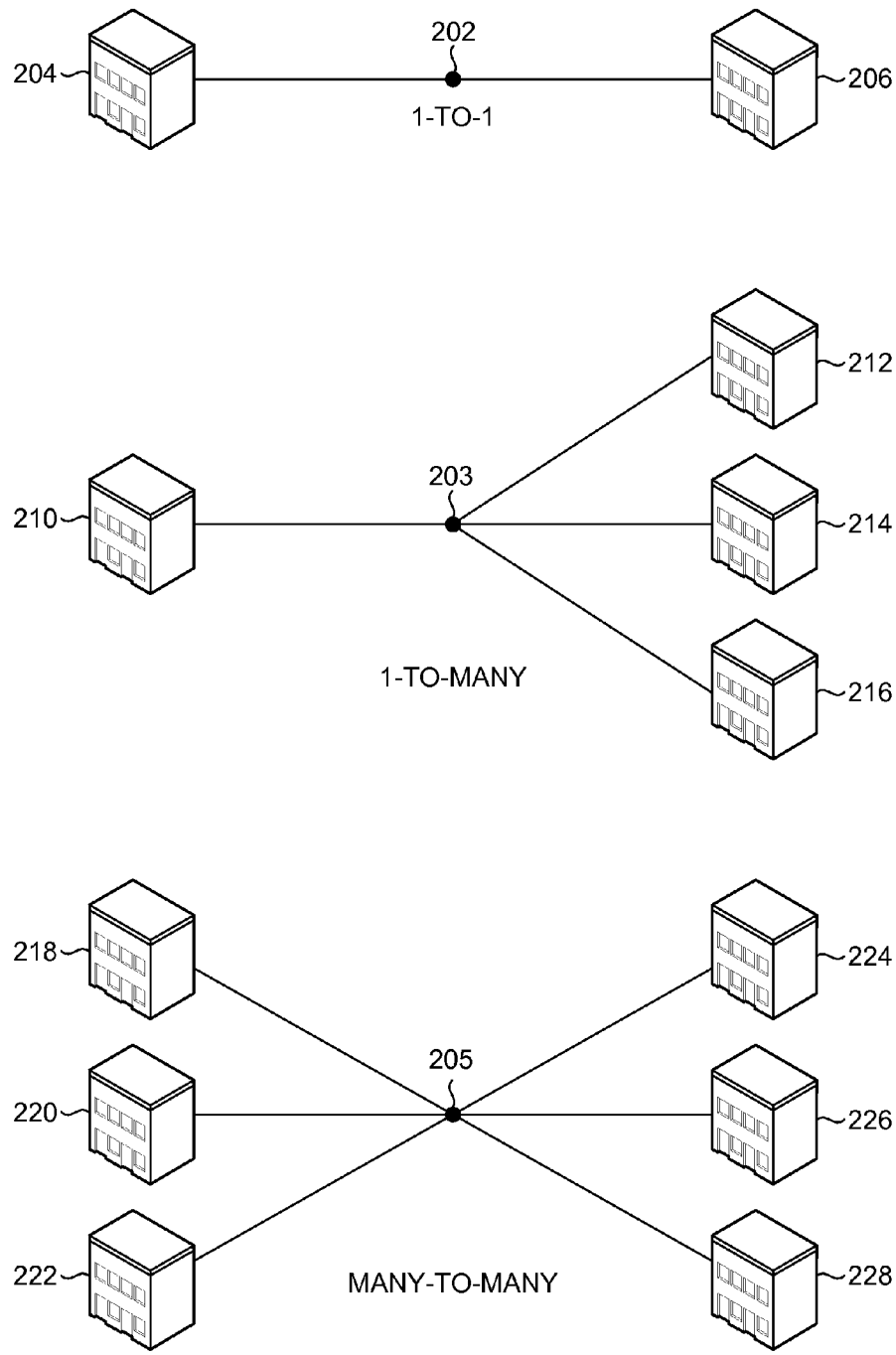
FIG. 2 is block diagrams of different relationships between advertisers, according to one embodiment.

FIG. 2 is block diagrams of different relationships between advertisers, according to one embodiment. Embodiments are not limited to co-campaigns between only two advertisers. In partnership 202, advertisers 204 and 206 have a one-to-one (1-1) co-campaign relationship. A one-to-one co-campaign relationship means that advertisers 204 and 206 are the only participants of the co-campaign. So advertiser 204 can boost the bid amount of advertiser 206's campaigns, in one embodiment. In another embodiment, advertiser 204 can collaborate with advertiser 206 in an online space to develop a web advertisement and/or campaign for the web advertisement together. In still another embodiment, advertiser 204 can request that advertiser 206 share the profile metrics that advertiser 206 is using in different campaigns. If advertiser 206 agrees to share, the user-profile metrics will be supplied to advertiser 204, allowing advertiser 204 to create a co-campaign consisting of the shared user metrics and a bid amount specified by advertiser 204.

Three types of co-campaigns will repeatedly be referenced herein. In fact, embodiments may include any of these three co-campaigns. To clarify, the three types of co-campaigns will be defined. The first, when advertiser 204 increments the bid amount advertiser 206 is currently bidding for a campaign, will be referenced as a "bid-boost" or "bid-boosting campaign." The second, when advertisers 204 and 206 collaborate on a web advertisement, will be referenced as a "combo ad." The third, when advertiser 206 shares user-profile metrics with advertiser 204 so advertiser 204 may use the shared user-profile metrics to create a campaign of its own, will be referenced as a "share-metrics" or "request-metrics" campaign. These reference names are provided to clarify the different types of co-campaigns contemplated by the embodiments discussed herein; however, the reference names are not meant to limit the co-campaigns in any way.

Particularly, a combo ad may be created by two or more advertisers passing an advertisement and/or metrics for a co-campaign back and forth until all advertisers agree on the advertisement to be used and the metrics for targeting web advertisement opportunities. In one embodiment, a centralized server (such as the campaign servers mentioned herein) facilitates communications between the different advertisers, transmitting one advertisers modifications of a draft advertisement to other partner advertisers. Additionally, the centralized server may also communicate different metrics the advertiser wishes the co-campaign to target. For example, suppose a car manufacturer wishes to create a co-campaign with all its dealers in a particular geographic area. The car manufacturer may initially propose a draft of a particular online advertisement and send the draft to all of dealers along with user-profile metrics to which to advertise. Each dealer can then modify the online advertisement and user-profile metrics to make the online advertisement more efficient. This back-and-forth interaction may continue until all of the car manufacturers and the dealers create an advertisement user-profile metrics all advertisers can agree upon and used in the co-campaign.

For a share-metrics co-campaign, a potential partner advertiser's (or advertisers') user-profile metrics may be requested by an advertiser. In essence, the advertiser is asking to use the user-profile metrics for targeting users for the advertiser's own advertisements. Alternatively, the advertiser may just want to follow the potential partner advertiser's lead in targeting users—for instance, when the user-profile metrics are confidential to the potential partner advertiser. In this situation, the advertiser may request the user-profile metrics for a particular product, service, or ad campaign, and if the request is accepted by the potential partner advertiser, the specific user-profile metrics can be used by the advertiser for targeting purposes. As a condition of the co-campaign, the potential partner advertiser may wish to keep the user-profile metrics secret, and thus create a co-campaign where the advertiser can only use the user-profile metrics but not know them.

Advertisers may alternatively choose to not show particular advertisements based on a partner advertiser's advertisement already being shown. In this embodiment, an advertiser may choose to show a different advertisement image when positioned next to partner advertiser's advertisement. For example, AT&T® could show an advertisement for a particular mobile phone whenever the mobile phone's company is not similarly also advertising on the web page, but when the mobile phone company also is showing an advertisement, AT&T® may elect to show a different advertisement that does not include the mobile phone. This scenario ensures that viewer is not inundated with multiple advertisements for the same product—which, in some advertising scenarios, may be detrimental to AT&T® and the mobile phone company's advertising agendas.

Co-campaigns may be conditioned on different rules based on the advertisements being shown on a web page. For instance, both Microsoft® and Hewlett Packard® may each have their own campaigns that are bidding the keyword "laptop." The two may also have a co-campaign that likewise bids on the keyword "laptop." A scenario may then result in Microsoft®, Hewlett Packard®, and their co-campaign being the top three campaigns for an advertisement spot on the web page. Instead of merely showing all three advertisements (i.e., one from a Microsoft® campaign, one from a Hewlett Packard® campaign, and one from the co-campaign), the co-campaign may include rules that condition it to only trigger when neither a Microsoft® or Hewlett Packard® campaign are already selected for display on the web page, thus alleviating duplicate advertisements for each advertiser. In essence, one advertiser may construct either campaigns or co-campaigns that only display advertisements when other campaigns or co-campaigns of the advertiser are not already being chosen for display on the web page.

Campaign management is also important in the selection and creation of co-campaigns. Once created, a co-campaign may later be modified by different advertisers. For example, partner advertisers may agree on a specific price for a product and choose an advertisement in a co-campaign advertising that price. Upon hearing of a competitive product's recent price drop, the partner advertisers may quickly change the co-campaign to include an advertisement that advertises the product's features instead of price. One skilled in the art will appreciate that numerous other scenarios for changing co-campaigns, without having to create new ones, are also contemplated by the embodiments herein.

Alternatively, co-campaigns may be created in such a manner to not allow modifications ever or for during certain pre-agreed upon time periods. For example, two advertisers may create a co-campaign that shows an advertisement to a particular group of users for a month, and the co-campaign, once created, may not be changed by either advertiser during the month. One skilled in the art will appreciate that numerous other scenarios for restricting changes to co-campaigns are also contemplated by the embodiments herein.

Advertisers may form co-campaigns that allow multiple advertisers to form different relationships. FIG. 2 is block diagram showing different relationships between advertisers, according to one embodiment. Specifically, embodiments may include co-campaigns organized in a one-to-one (1-to-1), one-to-many (1-to-many), or many-to-many relationship, illustrated as relationships 202, 203, and 205, respectively. In particular, relationship 202 illustrates a 1-to-1 relationship between advertisers 204 and 206. Relationship 203 illustrates a 1-to-many relationship between advertisers 210, 212, 214, and 216. Relationship 205 illustrates a many-to-many relationship between advertisers 218, 220, 222, 224, 226, and 228. Relationships 202, 203, and 205 show that a single advertiser may have a co-campaign with one or several advertisers. For example, suppose an online auction has numerous individuals and companies selling their products on the online auction's website. The online auction may then have an interest in promoting web advertisements for the registered individuals and companies, hoping that additional traffic to the registered individuals' and companies' web sites may mean additional web traffic to the online auction—or even better, additional purchases at the online auction.

In particular, relationship 205 illustrates a many-to-many co-campaign. In this relationship, numerous advertisers may contribute to one co-campaign that other advertisers also contribute to. As shown, advertisers 218, 220, and 222 may form a co-campaign with multiple advertisers 224, 226, and 228. For example, several different oil refineries may have an interest to promote several different gas stations in a geographic region that are operated by a particular gasoline distributor. For instance, Chevron®, Exxon Mobil®, and Weber Oil® may want to promote Shell® gasoline, which is sold at multiple different retailers in a certain town. To do so, both the oil companies and gasoline retailers may contribute to a co-campaign that promotes the local gasoline retailers to a user searching online for different gas stations in the town. The local retailers benefit from promoting Exxon Mobil®, Chevron®, and Webber Oil® because doing so helps these three sell oil to Shell®, and thus lower the price of gasoline for the local gasoline retailers.

The advertiser relationships depicted in FIG. 2—1-to-1, 1-to-many, and many-to-many—may also be formed to carry out competitive campaigns. For example, two advertisers create a 1-to-1 relationship that can be used to bid boost competitors' campaigns of targeted entities. To illustrate such a relationship, two software makers, Microsoft® and IBM®, could create a 1-to-1 relationship. Together, the two can collectively increment bids of advertisements for HP® laptop campaigns whenever Apple® laptop advertisements are shown, thus helping to show competitive advertisements (HP® advertisements) next to the advertisements of the two software company's competitor (Apple®). In essence, such partnering allows multiple entities to combine their resources to target competitors in competitive campaigns. Similarly, 1-to-many and many-to-many partnerships may be formed and used to create competitive campaigns.

Figure 3:
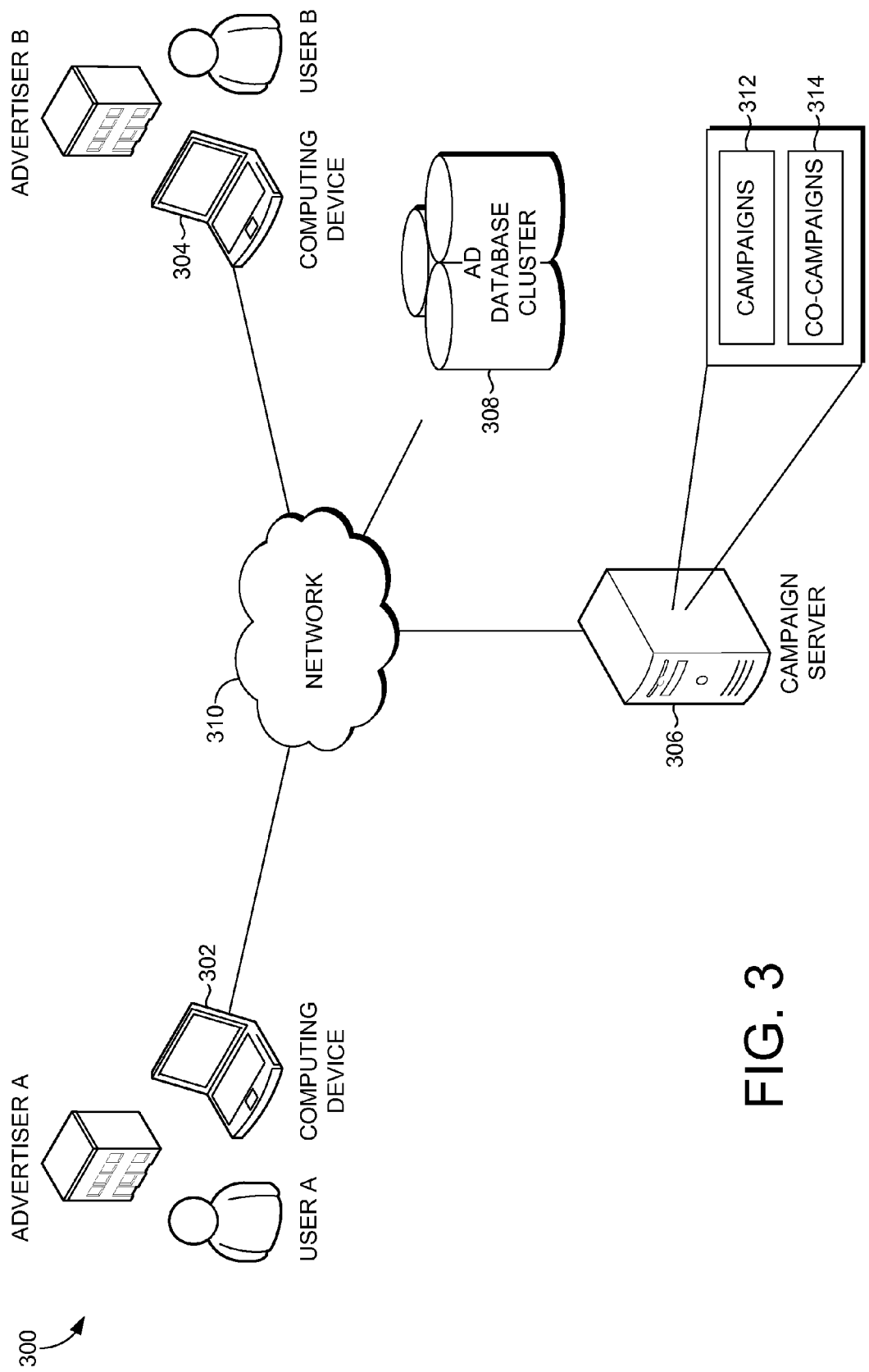
FIG. 3 is a block diagram of a networking environment configured to create and manage co-campaigns, according to one embodiment.

FIG. 3 is a block diagram of a networking environment configured to create and manage co-campaigns, according to one embodiment. As shown, a computing device 302, computing device 304, campaign server 306, and advertisement database (ad database) cluster 308 are communicatively connected across a network 310.

Computing devices 302 and 304 may be any type of computing device, such as the device 100 described above with reference to FIG. 1. By example, without limitation, computing devices 302 and 304 may each be a personal computer, desktop computer, laptop computer, handheld device, mobile phone, electronic tablet, or other personal computing device. In particular, computing devices 302 and 304 may be configured with web browsers capable of rendering web pages on the World Wide Web and accessing different user UIs described herein.

The network 310 may include any computer network, for example the Internet, a private network, local area network (LAN), wide area network (WAN), or the like. One network 310 comprises a LAN networking environment, components may be connected to the LAN through a network interface or adapter. In an embodiment where the network 310 provides a WAN networking environment, components may use a modem to establish communications over the WAN. The network 310 is not limited, however, to connections coupling separate computer units. Instead, the network 310 may also include subsystems that transfer data between a server and the computing devices. For example, the network 310 may include a point-to-point connection. Computer networks are well known to one skilled in the art, and therefore do not need to be discussed at length herein.

The campaign server 306 represents a server (or servers) configured to execute different web-service software components. Campaign server 306 includes a processing unit and computer-storage media storing instructions to create and manage co-campaigns for multiple advertisers. While campaign server 306 is illustrated as a single box, one skilled in the art will appreciate that the campaign server 306 may, in fact, be scalable. For example, campaign server 306 may actually include multiple servers operating various portions of software that collectively create and manage co-campaigns for advertisers. In one embodiment, both ad campaigns 312 and co-campaigns 314 are created, managed, and stored on the campaign server 306.

Ad database cluster 308 represents one or more database servers configured to store and manage databases of information associated with users visiting web pages and also different campaigns and/or co-campaigns. In other words, ad database cluster 308 is a storage dumping ground for information collected from web advertising services (not pictured in FIG. 3 for clarity). Specific to the embodiments discussed herein, ad database cluster 308 includes historical tracking data about user profiles from different users accessing web pages on the World Wide Web.

It should be noted that the networking environment 300 shows the hardware necessary to establish a one-to-one co-campaign. Additional computing devices and campaign servers may be added to form one-to-many or many-to-many co-campaigns. For the sake of clarity, however, the one-to-one co-campaign is discussed to illustrate several of the embodiments.

In operation, a person sitting at computing device 302 will be attempting to create a co-campaign for advertiser A, which could be the person's employer, organization, blog, business, or other entity. In one embodiment, the person accesses a web page for registering or creating co-campaigns using computing device 302. The web page may be configured to present several options for creating the co-campaign, such as creating a bid boosting, combo ad, or request metrics co-campaign. Also, the web page may provide options for creating any of the aforementioned advertising partnership relationships (one-to-one, one-to-many, and many-to-many).

In one embodiment, the person can select the individual or entity that the person wishes to form the co-campaign with in the web page. In one embodiment, the person simply enters the name of the individual or entity, resulting in the campaign server 306 performing a keyword or context search for individuals or entities stored in the ad database cluster 308. For example, advertiser A may be the Microsoft®, and the person may be a marketing manager for Microsoft®. If the marketing manager wishes to create a co-campaign with Hewlett Packard®, the marketing manager can simply enter "Hewlett Packard" or "HP" into a textbox on the web page and let the campaign server 306 search for entities and individuals who may match HP. Alternatively, the campaign server 306 may be configured to not conduct context or keyword searches of names entered by the person on computing device 302 in an effort by the web-advertisement service to preserve its clients' privacy.

The co-campaign request is sent to the computing device 304, which operates as a terminal for marketing personnel of advertiser B. The personnel can approve or reject the co-campaign request. If approved, the campaign server 306 creates and stores—either locally or remotely—a co-campaign 314 for the advertisers A and B. The creation or management of co-campaign 314 may require the campaign server to access different campaigns 312 stored for advertiser A, advertiser B, or both. For example, if the co-campaign is a bid-boosting co-campaign, co-campaign 314 may comprise the user-profile metrics for one of the campaigns 312 of advertiser B incremented by a bid amount offered by advertiser A. The results would be a co-campaign with the user-profile metrics of a campaign for advertiser B and a bid amount that includes X dollars previously bid by advertiser B plus Y dollars recently bid by advertiser A to boost the bid amount.

Alternatively, in the instance where the co-campaign 314 represents an ad combo, the co-campaign 314 may comprise a collaborative advertisement image or file (e.g., Flash, HTML, or the like). Still, if co-campaign 314 is a share-metrics co-campaign, co-campaign 314 may comprise the user-profile metrics from a campaign 312 of the advertiser B and one or more bid amounts specified by the advertiser A—effectively allowing the advertiser A to bid any amount on the user-profile metrics of a campaign already stored for the advertiser B.

In addition, a share-metrics co-campaign may comprise a web advertisement from advertiser A, instead of advertiser B. Considering the Microsoft®-Hewlett Packard® example detailed above, the user-profile metrics Hewlett Packard® typically uses to display web advertisements about its laptops would be used in a share metrics co-campaign that includes an advertisement for Microsoft® software as well as the Hewlett Packard® user-profile metrics. As a result, Microsoft® web advertisements could be directed towards web visitors Hewlett Packard® has been targeting for its laptops. Or, in another example, Hewlett Packard® might like to build a co-campaign using the user profiles Microsoft® has of users who have older computers. In exchange, Hewlett Packard® may share with Microsoft® the user profiles Hewlett Packard® has of users who have recently purchased Hewlett Packard® machines, and thus may be relevant targets for upgrade offers for different versions of Microsoft Windows®.

Figure 4:
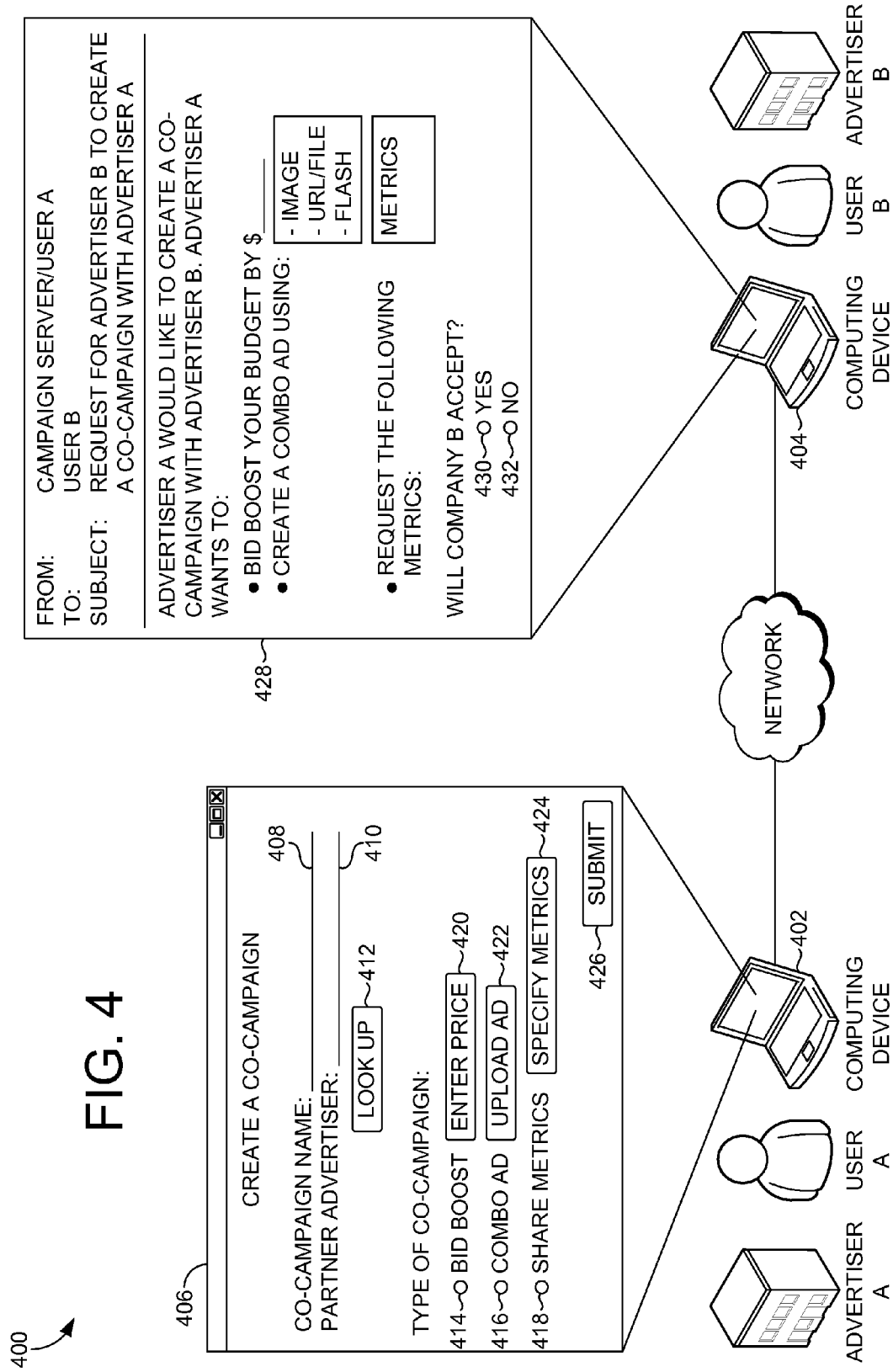
FIG. 4 is a block diagram illustrating two users at two different companies forming a co-campaign online, according to one embodiment.

FIG. 4 is a block diagram illustrating two users at two different companies forming a co-campaign online, according to one embodiment. As shown, user A is attempting to create a co-campaign between advertisers A and B. Using computing device 402, user A accesses web page 406, which includes a page to create a co-campaign (i.e., the page that is illustrated). There, user A can enter a name for the co-campaign in text field 408. User A can also specify the partner advertiser—in this case advertiser B—of the co-campaign at textbox 410. If user A does not know the formal name of advertiser B, user A can select the LOOK UP button 412 to trigger the application server to search for known advertisers that may match the name entered into the textbox 410.

Additionally, user A may select the type of co-campaign user A wishes to create by selecting one of the options 414, 416, and 418 for creating a bid-boost, combo ad, or share-metrics co-campaign. Depending on the type of co-campaign selected, user A may elect to enter a bid amount price using button 420, upload an advertisement using button 422, or specify the metrics user A wants to receive using button 424. In the case of a share-metrics co-campaign, one embodiment allows the user to enter a message for delivery to user B that states what advertiser B product or service user A is requesting user-profile metrics for. For example, suppose advertiser A was a tire manufacturer and advertiser B was a car manufacturer that buys advertiser A's tires. User A could send user B a message stating that the tire company would like to use the user-profile metrics the car manufacturer is currently using to identify potential web users to display the car manufacturer's web advertisements to. Once the message is entered, the application server sends the message to user B.

When user A is finished filling out the co-campaign creation form of the web page 406, user A selects the SUBMIT button 426. Consequently, a message 428 is sent to user B detailing user A's request to create a co-campaign between advertiser A and advertiser B. Message 428 may be any type of well-known electronic message, such as, for example but without limitation, an e-mail message, short message service (SMS) message, multimedia messaging service (MMS) message, or the like. Message 428 may include a host of information about the request sent by user A. In the embodiment shown, message 428 states that advertiser A would like to create a co-campaign with advertiser B and specifies what type of action advertiser B proposes.

For a combo ad, message 428 may include an image, text, trademark, logo, URL or file path, or flash file of an initial attempt at the combo ad. Also, in the case of a request to share metrics, the message specified by user A describing the requested product, service, or user-profile metrics may be included. Eventually, user B will be prompted to accept or reject user A's request, using buttons 430 and 432. Rejection of the co-campaign may prompt a message to be sent back to user A that user A's request was denied, and similarly, acceptance of user A's request may also be confirmed through a message back to user A. When user B agrees to create the co-campaign, the application server creates the co-campaign, and afterward, manages the co-campaign—i.e., uses the co-campaign as a regular campaign competing for advertising spaces in rendered web pages. Also, in one embodiment, a co-campaign may be configured to inherit all existing dimensions of an online advertisement campaign as well as additional features, such as those specified in FIG. 4.

Figure 5:
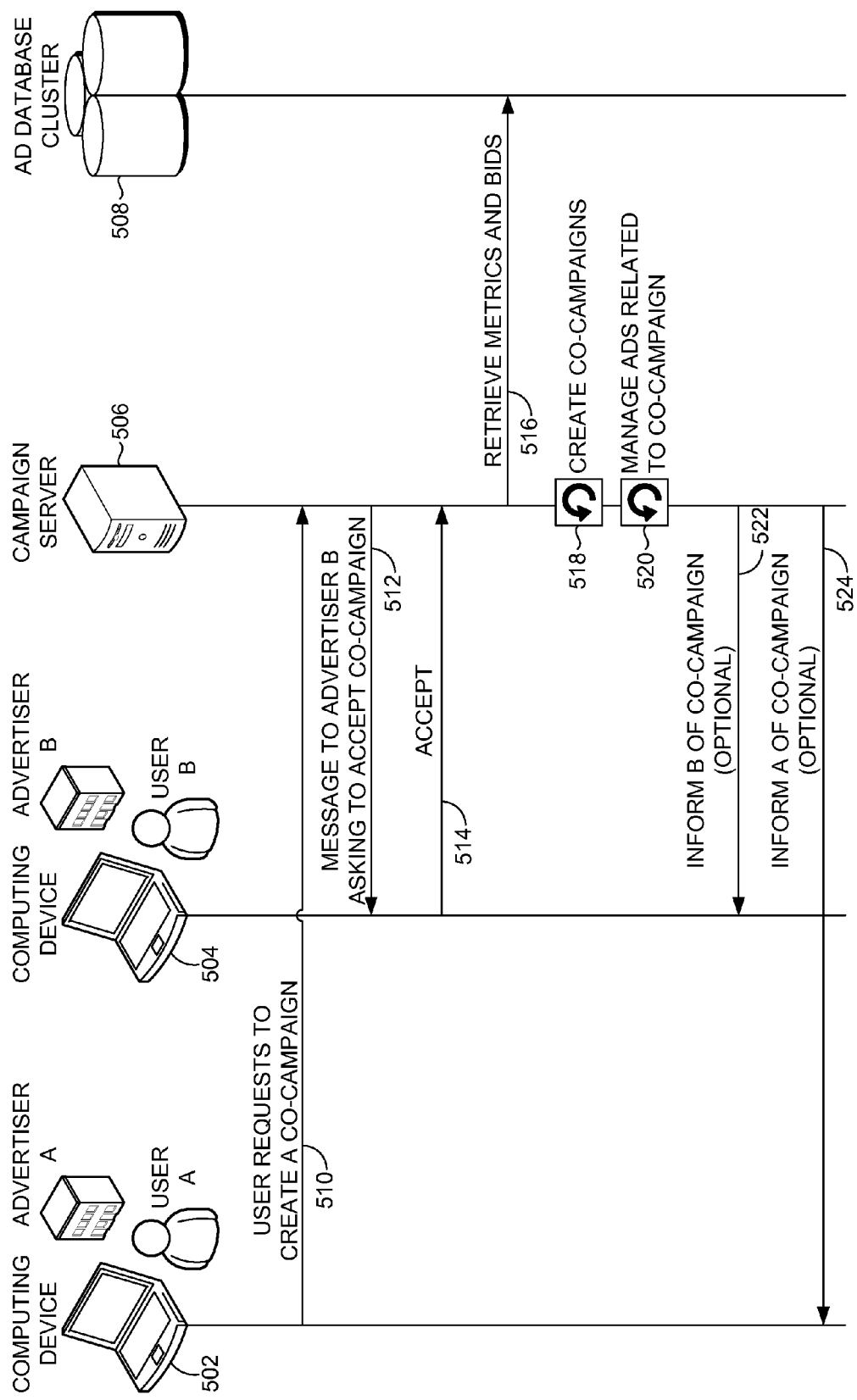
FIG. 5 is an interactive block diagram showing the flow of active between multiple devices in order to create and manage a co-campaign, according to one embodiment.

FIG. 5 further illustrates multiple advertisers interacting to create co-campaigns. Specifically, FIG. 5 is an interactive block diagram showing the flow of active between multiple devices in order to create and manage a co-campaign, according to one embodiment. Illustrated generally as flow 500, an interaction over a network is shown between computing devices 502 and 504, campaign server 506, and ad database cluster 508. It should be noted, however, that alternative embodiments may employ addition computing devices, servers, and/or databases. Thus, flow 500 is provided merely for explanatory purposes, illustrating merely one embodiment.

Flow 500 begins initially with user A submitting a request to create a co-campaign to the campaign server 506, as illustrated at 510. user A represents an employee of advertiser A, which is an advertiser trying to create a co-campaign with advertiser B. The co-campaign user request may include any selections of the options discussed previously—e.g., co-campaign name, partner advertiser, type of co-campaign, etc. Although not shown for the sake of clarity, the campaign server 506 may interact with computing device 502 in order to illicit different option selections. For example, the campaign server 506 may provide a list of potential partner advertisers to a computing device 502 so that user A can select the particular co-campaign entity that advertiser A wishes to create a co-campaign with. Eventually, the interaction of the campaign server 506 and computing device 502 will create a co-campaign request.

In response to the co-campaign request, the campaign server 506 sends a message to advertiser B asking for acceptance of the requested co-campaign. In one embodiment, the message includes an option for user B at advertiser B to accept, reject, or modify the co-campaign request. For example, advertiser B may only accept the co-campaign request from advertiser A if advertiser A's bid boost amount is greater than a certain amount of money. Or, in another example, the message may provide user B with a draft of a combo ad created by user A, including an image, flash file, or link to a document of the draft combo ad. User B can then modify the draft combo ad and send the modified combo ad back to user A and—through the campaign server 506—to see if user A will approve the modifications to the combo ad. In other words, the campaign server 506 may facilitate user A and user B passing modified combo ads until user A and user B reach an agreement on a finalized combo ad.

As illustrated at 514, user B may accept the co-campaign request from the campaign server 506, resulting in the campaign server 506 retrieving different metrics and bids from the ad database cluster 508 in order to create the co-campaign, as shown at 518. If advertiser A only request to bid boost a current campaign of advertiser B, the campaign server 506 retrieves the current metrics and bid amounts of the appropriate current campaign of advertiser B from the ad database cluster 508 and increments the bid amount currently stored by the bid boost amount specified in the co-campaign request from user A. For a combo ad, the campaign server 506 may simply store the agreed upon combo ad in the ad database cluster 508 and, additionally, store a combined bid amount from advertisers A and B in the ad database cluster 508. As for a metrics sharing co-campaign, the campaign server 506 may retrieve the metrics advertiser B has agreed to share with advertiser A from the ad database cluster 508.

Different embodiments may store created co-campaigns, or portions of created co-campaigns, in different places. In one embodiment, created co-campaigns are stored on the campaign server 506. Alternatively, created co-campaigns may be stored on the ad database cluster 508. Yet, in another embodiment, the campaign server 506 and the ad database cluster 508 are stored on the same server that stores different co-campaigns, campaigns, metrics, and/or bid amounts.

Once a co-campaign is created, campaign server 506 manages the created co-campaign, as shown at 520. When managing a created co-campaign, performs the campaign server 506 any of the aforementioned actions of a co-campaign. For example, the campaign server 506 may increment a current campaigns bid amount by a bid boost amount from advertiser A. In another example, a combo ad may be provided to a web advertising service along with different metrics and bid amounts from user A and user B. Still another example, in the case of a share metrics co-campaign the requested and approved metrics to be shared between advertiser A and advertiser B may be provided to user A or may simply be used by advertiser A to create its own co-campaign. These examples are provided merely for explanatory purposes and are not meant to limit the embodiments discussed herein.

Optionally, messages may be sent to user A and/or user B when a co-campaign is created. The messages may not only alert user A and user B about the creation of a co-campaign; the messages may also provide terms of the co-campaign, inform the Users of the duration of the co-campaign, provide instructions for modifying the co-campaign, or provide contact information of one user to another user. Also, if user A or B modify the co-campaign, all co-campaign participants may be notified of the change by the campaign server 506. All participants may also be allowed to freely view the co-campaign settings at any time or drop out of the co-campaign at any time. In an alternative embodiment, the co-campaign may create a contract between advertisers A and B that spans a certain time period. In this scenario, advertisers A and B may restricted from changing the co-campaign settings during the time period.

Figure 6:
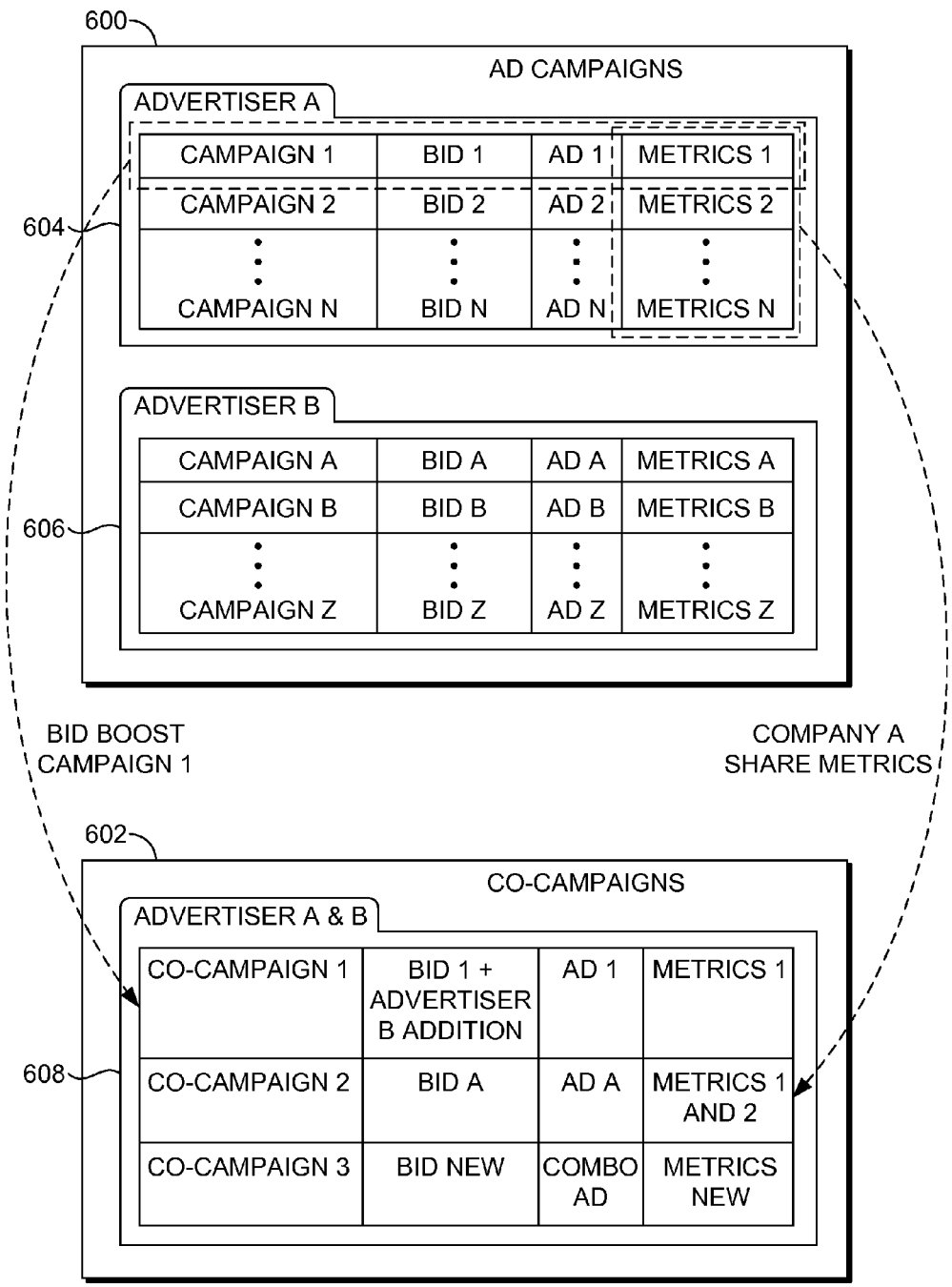
FIG. 6 illustrates a tabular representation of ad campaigns and co-campaigns, according to one embodiment.

FIG. 6 illustrates a tabular representation of ad campaigns and co-campaigns, according to one embodiment. FIG. 6 shows tabular representations of ad campaigns 600 and co-campaigns 602 stored in the memory of different servers. In particular, the ad campaign 600 comprises different campaigns from advertiser A 604 and different campaigns from advertiser B 606. For instances, the campaigns 604 for advertiser A include campaigns 1, 2, and so on to campaign N, with each campaign comprising different bids, advertisements, and other metrics. Taking campaign 1 as an example, campaign 1 may be stored with bid amounts 1, advertisement 1, and varying metrics 1. Likewise, campaign 2 for advertiser A may also have its own bid amount, advertisement, and metrics. The same can also be said for campaigns A, B, and so on to Z for advertiser B.

Upon creation, co-campaigns 608 may be stored separately from the campaigns of advertisers A and B. As illustrated, co-campaigns 1 and 2 represent co-campaigns created for advertisers A and B. Specifically, co-campaign 1 shows a bid boost co-campaign that, when stored, includes a bid amount (bid 1) from a previous campaign (campaign 1) incremented by a bid addition from an advertiser (advertiser B) with no affiliation to the campaign (campaign 1). The resultant co-campaign created therefore includes the co-campaign name (co-campaign 1), bid amount (bid 1 plus advertiser B's addition), advertisement (ad 1), and user-profile metric (metric 1).

Co-campaign 2 represents a share-metrics campaign between advertisers A and B. For co-campaign 2, the different metrics (metrics 1, 2, and N) are combined and associated with the co-campaign. While co-campaign 2 is shown to include all of the metrics of all the campaigns for advertiser A, such may not be the case for alternative embodiments. For instance, advertiser B may only wish to use the metrics of advertiser A with respect to advertisements for a particular product of advertiser A. In that case, the combined metrics in the co-campaign may only include the metrics used in varying campaigns of advertiser A for that particular product, and not metrics used for campaigns of other products.

Furthermore, in the case of a combo ad co-campaign (co-campaign 3), the created combo ad may be stored, along with existing or new bid amounts and metrics agreed upon by advertisers A and B. For example, advertisers A and B may work together to create a combo ad and then agree upon appropriate bid amounts and metrics to use for the combo ad, as well as which entity is paying which percentage of the agreed on bid amounts. Alternatively, one particular advertiser may give the other advertiser free reign when choosing the bid amounts or metrics to use for the combo ad. Numerous other examples for structuring combo ad co-campaigns may also be used and stored.

Figure 7:
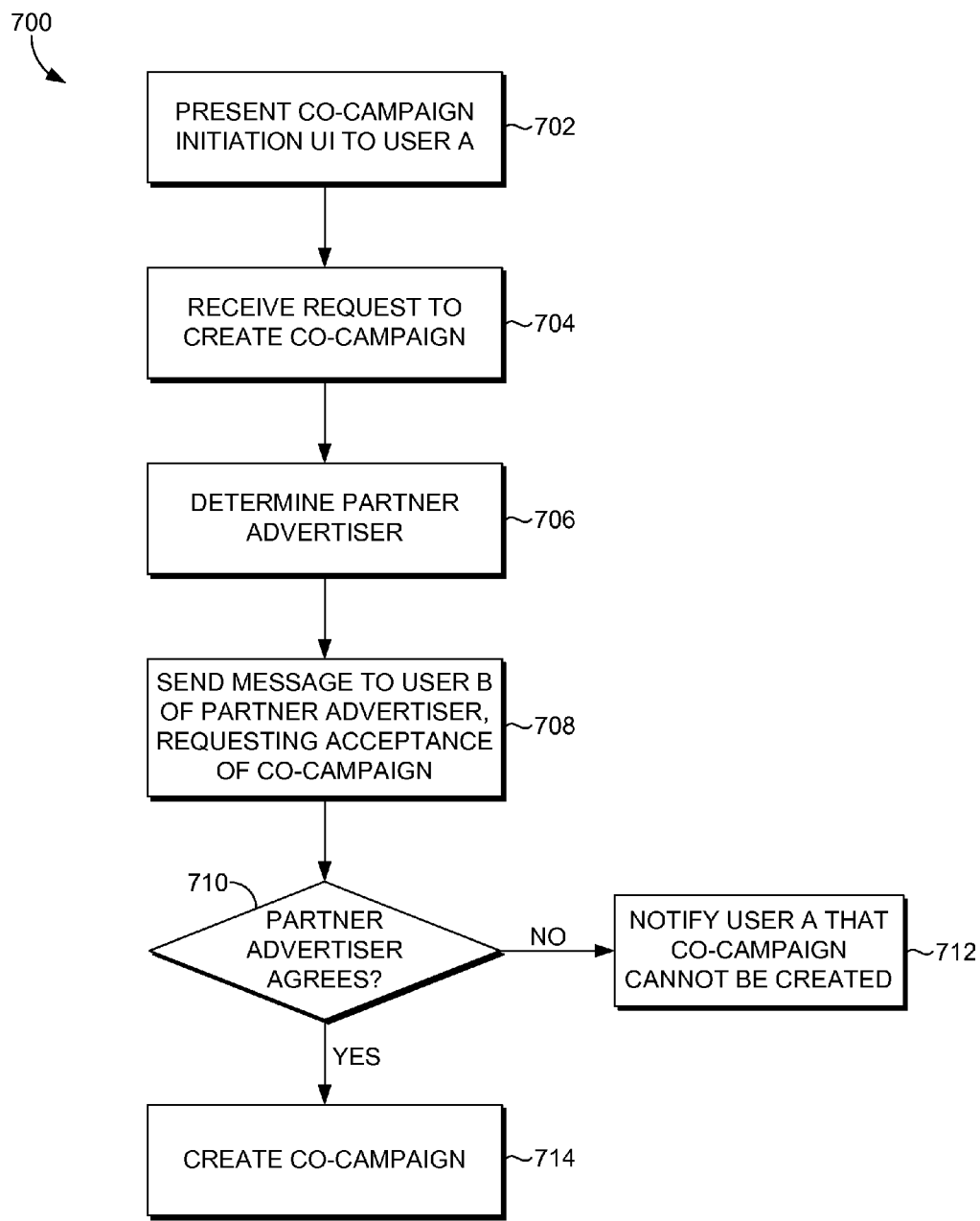
FIG. 7 is a diagram of a flow chart for creating a co-campaign, according to one embodiment.

FIG. 7 is a diagram of a flow chart for creating a co-campaign, according to one embodiment. The illustrated embodiment, generally references as flow 700, initiates by presenting a co-campaign initiation UI to a user (user A) as illustrated at 702. For instances, user A may navigate to a web page for creating co-campaigns, and the web page may be equipped with several interactive options for the user to select or enter information about the co-campaign. These options have been discussed somewhat at length above, for example in reference to FIG. 4.

Once the user has used the options to indicate what kind of co-campaign to create, the user may submit a request to create the co-campaign to an application server. When the application server receives the request, as shown at 704, the application server determines a partner advertiser for the co-campaign, as shown at 706. A "partner advertiser" as referred to herein, is an additional entity other than the entity seeking to create a co-campaign. For example, advertiser B in FIGS. 3-5 would be considered a partner advertiser of advertiser A. Partner advertisers may be determined in different ways. For example, the partner advertiser may be specified by user A on the co-campaign initiation UI. Alternatively, user A may request to look up or search for the partner advertiser, which may trigger the application server to perform keyword or context-based searching for names of entities specified by user A on the co-campaign initiation UI. In another embodiment, however, the application server may provide a look-up or search feature for potential partner advertisers because the application server may be configured to keep the names of other advertisers secret.

A message may be sent to user B of the determined partner advertiser, asking user B whether the partner advertiser will agree to create a co-campaign with user A's advertiser. Such is shown at 708. If user B agrees to the co-campaign on the partner advertiser's behalf, as shown at 710, the co-campaign is created by the application server, as shown at 714. On the other hand, if user B rejects the request, no co-campaign is created and user A is notified of the rejection, as shown at 712.

Turning now to competitive campaigns, advertisers may want to key condition the display of their advertisements on the display of their competitors' advertisements. In operation, advertiser A may want to show a particular advertisement whenever an advertisement from advertiser B is displayed. For example, Ford® may want to show an advertisement for a truck whenever Honda® is showing an advertisement for a truck to highlight differences (e.g., price, durability, etc.) between the two. To do so, Ford® can create a competitive campaign that, when executed, increments a bid amount for a particular advertisement only when it is known that a Honda® advertisement is selected for display on the web page, thus ensuring the advertisement gets displayed if Honda® has a truck advertisement selected for display. Other examples are discussed in greater detail below.

Figure 8:
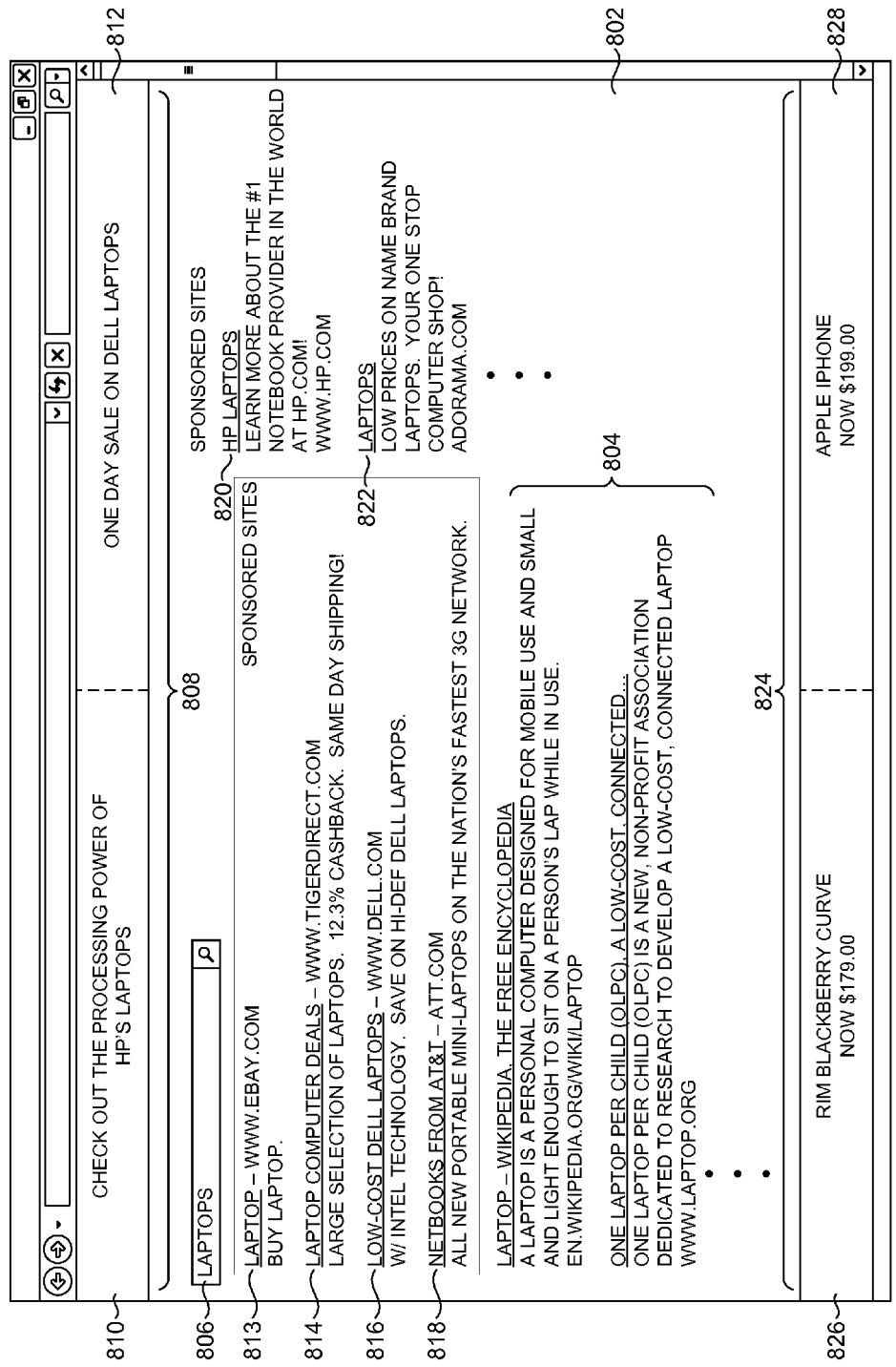
FIG. 8 is a diagram of a user interface (UI) displaying advertisements on a web page, according to one embodiment.

FIG. 8 is a diagram of a UI displaying advertisements on a web page, according to one embodiment. UI 800 shows a rendered web page 802 with search results 804 from a search engine query for a keyword 806 submitted by a visitor of the search engine. In addition to the search results 804, the web page 802 also includes several spaces for web advertisements. These spaces comprise spaces 810 and 812 in banner ad 808; spaces 813, 814, 816, 818, 820, and 822 for sponsored ads; and spaces 826 and 828 in footer ad 824. Different ad spaces may command different prices for displaying advertisements. For example, the ad spaces in banner ad 808 may be more expensive (e.g., $2/click-thru) than ad spaces in the footer ad 824 (e.g., $0.20/click-thru). Similarly, the ad space in the sponsored links may be less expensive the further down the web page 802 the ad spaces go—e.g., ad space 818 is less expensive than ad space 816, which is less expensive than ad space 814, and so on. Also, the sponsored ad spaces to the right of the keyword 806 may be less expensive than sponsored ad spaces 813-818.

Advertisements may be selected for display in the different ad spaces by an online auction conducted by an advertisement service. The online auction, in one embodiment, selects advertisements for different ad spaces based on bid amounts in campaigns, co-campaigns, and competitive campaigns. In operation, advertisements with the highest bid amounts or determined opportunity costs will be selected to populate the most expensive ad spaces. In one embodiment, opportunity costs are computed by multiplying a particular bid amount by a statistical click-thru rate indicating a calculated likelihood a viewer of the web page with the current viewer's user-profile metrics will click a particular advertisement.

Additionally, a relevancy factor may be considered by the advertisement service when selecting advertisements for ad spots. In one embodiment, the relevancy factor considers the web content of a landing page for an advertisement relative to keywords for a search query, content on the web page, or content at other web pages linked to the web page (e.g., content at the web pages provided listed as results of a search query). Relevancy is not merely limited to keywords or landing pages and may take into account user intent and user or web context. For example, if a user searches for "Samsung" at www.verizonwireless.com, the user intent is most likely for a Samsung® phone. Yet, if the user types in "Samsung" at www.microsoft.com, it may be more likely that the user intended to search for Samsung® computers. User intent may determined using any the aforesaid user-profile metrics, web page locations, cookies, or similar techniques.

A time factor may also be considered in some embodiments. If one searches for "flights to Miami" at 11:00 am looking to fly the following week, it may be determined that the person is most likely trying to book a business flight—because he/she is searching in the morning of a normal business day for a flight just a few days away. The time factor in this case may be used to pull advertisements of hotels in a well-known business district of Miami or that have business rates. On the other hand, if the search were conducted at 9:00 pm on a Saturday, the time factor may be used to indicate the traveler is seeking to book a flight for a getaway or vacation. In that case, tourist hotel and nightlife advertisements may be pulled for display.

UI 800 shows instances of advertisements in competitive campaigns being displayed. First, the banner ad 808 contains an advertisement for Hewlett Packard® laptops (in ad space 810) next to an advertisement from Dell® for a particular sale on laptops. Here, Dell® may wish to display advertisements whenever Hewlett Packard® is displaying an advertisement in order to promote a particular sale Dell® is having. Similarly, any of the advertisements in the sponsored ad spaces 813-822 may be positioned next to Another example of a competitive campaign is shown in footer ad 824, which includes advertisements for mobile phones by RIM® and Apple® in ad spaces 826 and 828, respectively. The competitive campaign allows RIM® to advertise the price of its touch screen phone next to an advertisement showing the price of an Apple® phone.

UI 800 may also show advertisements of competitive campaigns from two or more advertisers in a co-campaign. Suppose AT&T®, HP®, and Dell® were individually bidding on the keyword "laptops." Dell® bid a lower amount than HP®. But with the help of a co-campaign between Dell® and Microsoft®, Dell was able to surpass the HP® bid amount and consequently achieve a higher rank for the Dell®-Microsoft® co-campaign advertisement. As a result, the HP® advertisement may be pushed to a less frequently viewed or clicked ad space or off the web page entirely. Or alternatively, Apple® may not be bidding on "laptops," but Apple® may have a co-campaign with AT&T® to show advertisements for an Apple® phone. In this situation, Apple® and AT&T® may configure the co-campaign so that when an AT&T® advertisement is selected for display, the advertisement is modified to only be about the Apple® phone and not AT&T service rates. In another example. RIM® may target Apple® as a competitor in a competitive campaign, creating a competitive campaign to "follow" Apple® iPhone advertisements and always bid higher than Apple® to ensure RIM® gets a higher-ranked ad space when both advertisements are shown. The above examples are merely provided for explanatory purposes and numerous others may also be used.

Figure 9:
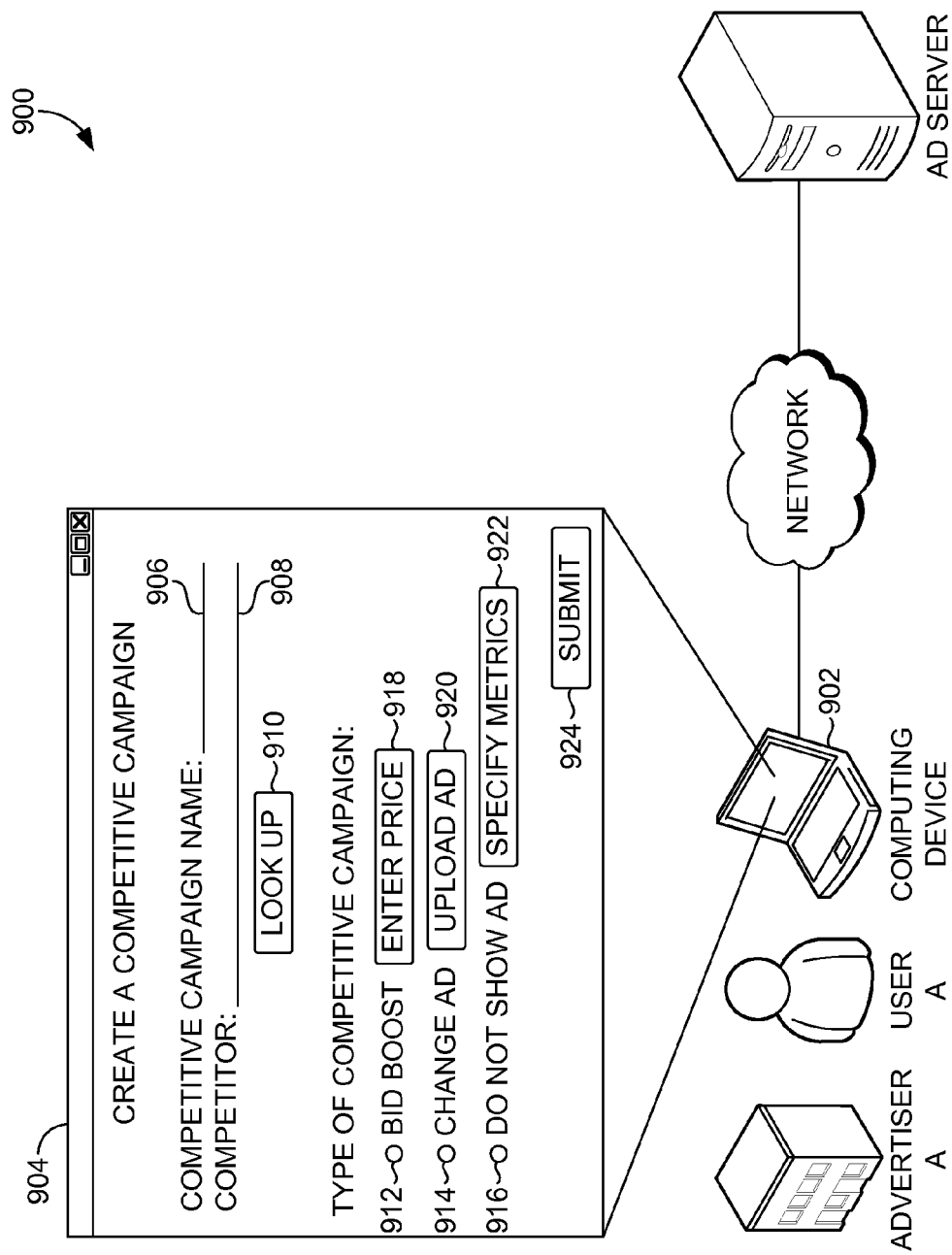
FIG. 9 is a block diagram illustrating a user creating a competitive campaign, according to one embodiment.

FIG. 9 is a block diagram illustrating a user creating a competitive campaign, according to one embodiment. Environment 900 shows user A creating a competitive campaign by filling out a form 904 online and submitting a request to an advertisement server (ad server 906). Form 904 may be accessed through a web page or can be a locally stored application residing on the computing device 902. Several options for creating the competitive campaign are provided by form 904. User A can enter a name for the competitive campaign in text field 906 and also specify a competitor at textbox 908. If user A does not know the formal name of competitor, user A can select the LOOK UP button 910 to trigger request that the ad server 906 search for and provide known advertisers that may match names entered into text box 908. Additionally, user A may select the type of competitive campaign user A wishes to create by selecting one of options 912, 914, or 916 for creating a bid-boost, change-ad, or remove-ad competitive campaign.

A bid-boost competitive campaign increments a bid amount associated with advertiser A's advertisement by an amount whenever the competitor indicated in the competitive campaign has an advertisement chosen for display on a web page. The increment amount, in one embodiment, is an amount that will make the current bid amount for the advertisement competitive with the bid amount for the competitor's advertisement in an online auction so that the advertisement will hopefully win an ad space in the auction close to—or at least on the same web page—as the competitor's advertisement.

Perhaps an example will shed some light. Suppose Toyota® (advertiser A) wishes to display an advertisement showing the improved horsepower for a new Toyota® compact car whenever a Ford® (competitor) advertisement for a compact car is shown. The Ford® campaign may include an advertisement and a bid amount authorized by Ford®. Toyota® can then include conditions in a competitive campaign for raising the bid amount currently associated with the Toyota® advertisement to an amount close enough or matching the bid amount in the Ford® campaign. Consequently, the two competitive campaign and campaign should, based on their close bid amounts, be given virtually even weight in an online advertisement auction so at the very least both advertisements are displayed and the most displayed in consecutive ad spaces (e.g., next to each other in a banner advertisement or on a sponsored ad list).

Bid amounts in a competitive campaign can be incremented in several different ways. In one embodiment, as mentioned above, the bid amount is simply raised from a current value to a value of a competitor's campaign. Alternatively, the advertiser in a competitive campaign may designate a specific quantity—either specifically or percentage—to raise the bid amount. In another embodiment, the advertiser of a competitive campaign specifies that the bid amount should merely be raised to a winning bid, meaning that the bid amount is just high enough to get the advertisement displayed. Such an embodiment may require a "MAX bid" setting that caps the bid amounts or increments of bid amounts in the case where two advertisers have competitive campaigns triggered off of each other. As a result, the two competitors may be engaged in a dead-lock scenario where both advertisers continually top the other's bid, and the process continues infinitely. The MAX bid setting caps the bid amounts, and in one embodiment, the first competitor to reach the MAX bid amount secure a particular ad space.

Along the same lines, the bid amount can be raised for the amount necessary to position the advertisement in different ad spaces, such as the top or bottom ad spaces or the ad space directly above or below the competitor's advertisement. Bid amount raises, increases, or conditions (e.g., secure the top, bottom, or adjacent bid) can be specified by user A by selecting ENTER PRICE button 918, which, when selected, initiates another UI allowing the user to enter the bid-boosting raises, increases, or conditions as well as conditions for triggering the bid-boost (e.g., competitor advertisement selected for display). Competitive campaigns may not only raise bid amounts, they may also allow a competitor the option to refuse to show its advertisement or decrease bid amounts whenever a competitor's advertisement is selected for display.

A change-ad competitive campaign dynamically changes an advertisement being selected for display by an advertising service based on a competitor's advertisement also being displayed. The change-ad competitive campaign is still conditioned on the selection of the competitor's advertisement for display, dynamically swapping a default advertisement going to be displayed for a different advertisement the advertiser identifies for display whenever the competitor's advertisement is chosen. For example, an advertiser may not wish to show an advertisement that states a price of a product on the same web page as a competitor's advertisement for a competing product being sold for lower price. In another example, the advertiser may want to change its advertisement to one specifically calling out the benefits of the advertiser's product over a competitor's product when the competitor's advertisement is shown. User A can upload a replacement advertisement using the UPLOAD AD button 920, which, when selected, initiates another UI for the user to upload advertisements and input conditions for displaying the replacement advertisement instead of a default advertisement.

Similarly, a remove-ad competitive campaign dynamically removes an advertiser's advertisement from contention for display whenever certain competitive conditions are met. Examples of such conditions include, without limitation, whenever a competitor's advertisement is selected for display and the competitor's advertisement indicates a better price, more robust features, or other competitive advantage over the advertiser's product or service. User A can specify different conditions for not showing an advertisement in another UI initiated when SPECIFY METRICS button 922 is selected. This additional UI may also be capable of receiving an indication of the advertisement not to be shown. While advertisers to blindly follow their competitors or compete with competitors through keywords, the advertisers may alternatively create competitive campaigns that use a relevancy factor and/or time factor to follow competitors. In such an embodiment, user A may input metrics related to relevancy, context, or time in addition to the options shown in FIG. 9.

It should be noted that in one embodiment settings in competitive campaign cannot be used to modify setting in another campaign or co-campaign. In other words, competitors, while able to influence their own campaigns and co-campaigns, cannot modify a competitor's campaign or co-campaign.

Competitive campaigns may be triggered on conditions other than merely having a competitor's advertisement selected for display. The conditions may also include the location of the ad space on the web page the competitor's advertisement is selected to populate. For example, a competitive campaign may be triggered only when a competitor's advertisement is placed in a banner ad but not in the sponsored ad spaces. Also, the conditions may include relevancy factors, such as whether the competitor's advertisement is be directed to a competing product of the advertisers. For example, mobile phone maker may only want to trigger a competitive campaign when another entity is advertising competitive mobile phones but not when the entity is advertising laptops. To further clarify this example, RIM® may only want to bid-boost a competitive campaign for a RIM® phone whenever an Apple® phone is going to be shown, yet not when an Apple® laptop is going to be shown.

Figure 10:
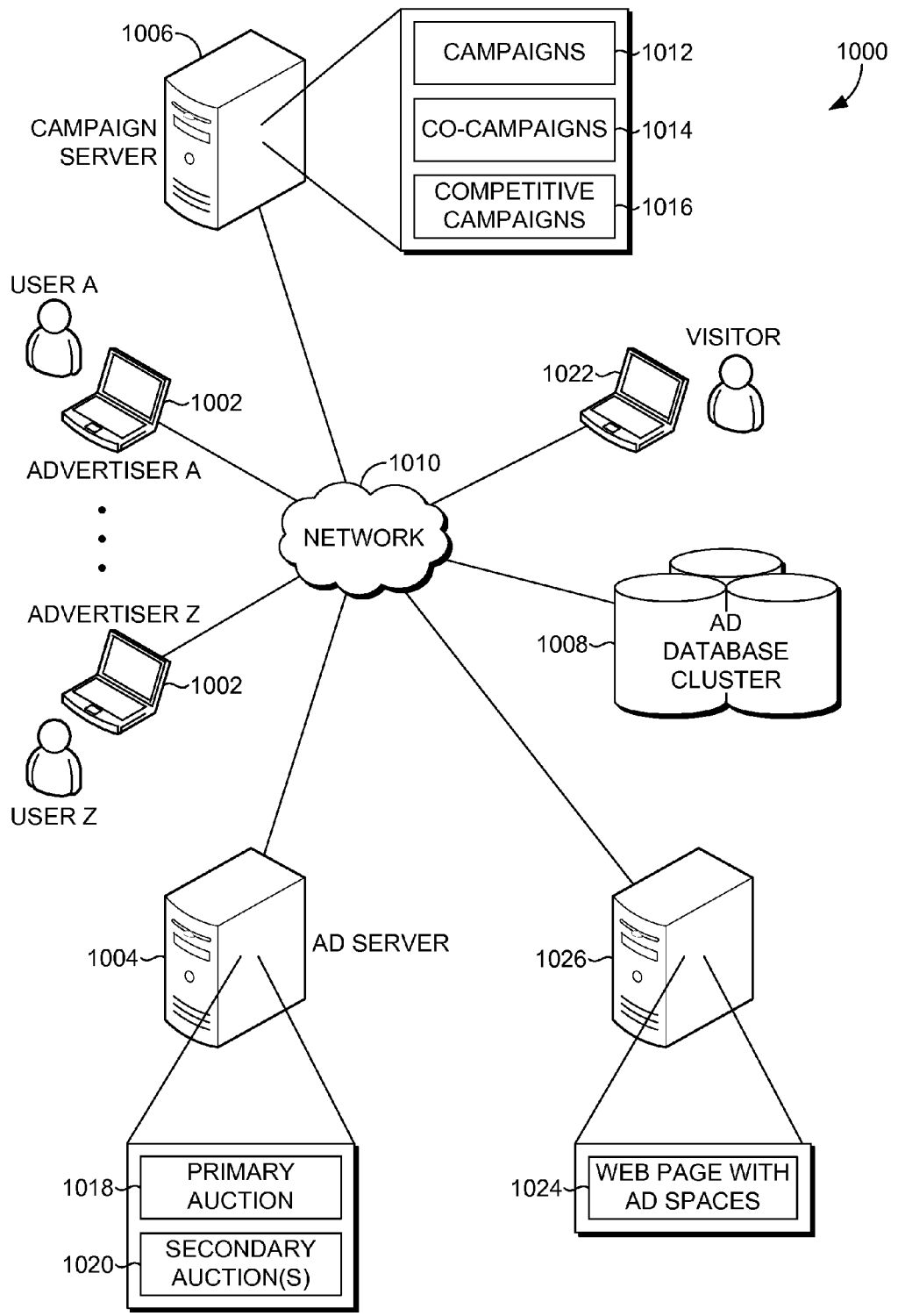
FIG. 10 is a block diagram illustrating a networking environment for creating and implementing competitive campaigns, according to one embodiment.

FIG. 10 is a block diagram illustrating a networking environment 1000 for creating and implementing competitive campaigns, according to one embodiment. Computing devices 1002 being used by advertiser personnel communicate, ad server 1004, campaign server 1006, and ad database cluster 1008 communicate across a network 1010. Additionally, a web-browsing user (shown as "visitor") can request to view a web page 1024—hosted on a web server 1026—that includes different ad spaces. Advertisements are selected for filling the various ad spaces by ad server 1004 working in conjunction with campaign server 1006 and the ad database cluster 1008. The computing devices (1002 and 1022), servers (ad server 1004, campaign server 1006), ad database cluster 1008, and network 1010 pictured in FIG. 10 may be implemented using various hardware, firmware, and software described above with respect the devices and networks in FIGS. 1, 3, and 5.

In operation, advertisers A-Z, using computing devices 1002, submit requests for creating competitive campaigns to campaign server 1006, which, as shown, may also manage various campaigns 1012 and co-campaigns 1014. The campaign server 1006 stores the competitive campaign 1016 and provides ad server 1004 access to the competitive campaign. The competitive campaign 1016 includes the name of the competitive campaign, name of competitor(s), keywords, bid amounts, bid boosts, and any of the competitive conditions described herein.

The campaign server 1006 allows the ad server 1004 access to the stored campaigns 1012, co-campaigns 1014, and the competitive campaign 1016. The ad server 1004 can then select advertisements based on the campaigns, co-campaigns, or competitive campaigns 1016 in one or more advertisement auctions, showing as primary auction 1018 and secondary auction 1020. The ad server 1004 conducts the auctions to select advertisements for different ad spaces to include on an instance of the web page 1024 being presented to the visitor. Put another way, web server 1026 call the ad server 1004 and request advertisements for the ad spaces on the web page 1024, so the web server 1026 can present an instance the web page 1024 with relevant advertisements.

Advertisements are selected for the ad spaces of web page 1024 through the primary auction 1018 and the secondary auction 1020—both of which may be implemented in computers instructions stored on computer-storage media. The primary auction 1018 interacts with the campaign server 1006 to access the different campaigns 1012, co-campaigns 1014, and competitive campaigns 1016. Potential advertisements for the ad spaces of the web page 1024 are identified by the metrics and competitive conditions of the campaigns 1012, co-campaigns 1014, and competitive campaigns 1016 compared to any one or combination of the user-profile characteristics of the visitor, the content of the web page 1024, keywords submitted by the visitor, and/or content of landing pages or advertisements associated with the various campaigns. The campaigns identify different advertisements that for the primary auction 1018 to rank based on bid amounts advertisers are willing to pay to show an advertisement on the web page 1024 to the visitor, or, for competitive campaigns 1016, the bid amounts advertisers are willing pay to have advertisements displayed on the same page as a competitor's advertisement.

Additionally or alternatively, the primary auction 1018 may rank advertisements based on other factors than bid amounts, such as relevancy scores based on the content of an advertisement or advertisement's landing page compared to keywords submitted by the visitor, user-profile metrics of the visitor, content of the web page 1024, landing pages of other advertisements closely ranked advertisements, or some combination thereof. Also, a computer opportunity cost value may be used by the primary auction 1018 to rank the advertisements. In one embodiment, opportunity cost is calculated using the following formula:

$$\text{Opportunity Cost} = \text{Bid Amount} \times \text{Statistical CTR}$$

This formula simply multiplies the bid amount of a campaign 1012, co-campaign 1016, or competitive campaign 1016 (including increased bid amounts for competitive campaigns) by a statistical CTR computed by analyzing historical CTRs of similar advertisements being shown on the web page 1024, or similar web pages, to visitors with user-profile metrics similar to the visitor. For example, the statistical CTR may be relatively low (e.g., 5%) for advertisements about hotels in Kansas City when the advertisement in placed on a web about hotels to a visitor in Seattle.

Bid amounts or opportunity costs may be used to rank the different campaigns, co-campaigns, and/or competitive campaigns to determine which ones will qualify for the ad spaces of the web page 1024. For instance, if the web page 1024 has ten ad spaces, the highest ten bid amounts or opportunity costs will determine a list of potential advertisements.

Some or all of the potential advertisements may trigger competitive conditions of the competitive campaigns 1016 that change bid amounts or opportunity costs. For example, a Microsoft® advertisement being chosen for an ad space may trigger other advertiser's to increase bid amounts in hopes that their advertisements can be placed close to the Microsoft® advertisement. To consider these changes in bid amounts or opportunity costs, the ad server 1004 may conduct the secondary auction 1020—or auctions—to maximize the amount of money received for advertisements on the web page 1024. The ad server 1004 uses the secondary auction 1020 to compute the optimal combination of advertisements to display. In one embodiment, the optimal combination is determined by the combination of advertisements that will generate the greatest amount of money, based on bid amount or opportunity costs.

Alternatively or additionally, the optimal combination may consider a relevancy factor based on user-profile metrics of the visitor, statistical CTRs, content of the web page 1024, content of landing pages, or other relevant factors. Once identified, the advertisements in the optimal combination may be allotted to the ad spaces in the web page 1024 based on the ranking performed by the primary auction 1018 and secondary auction(s) 1020. From the optimal combination, the more expensive ad spaces are populated with higher ranked advertisements and the less expensive ad spaces are populated with the lower ranked advertisements.

Figure 11:
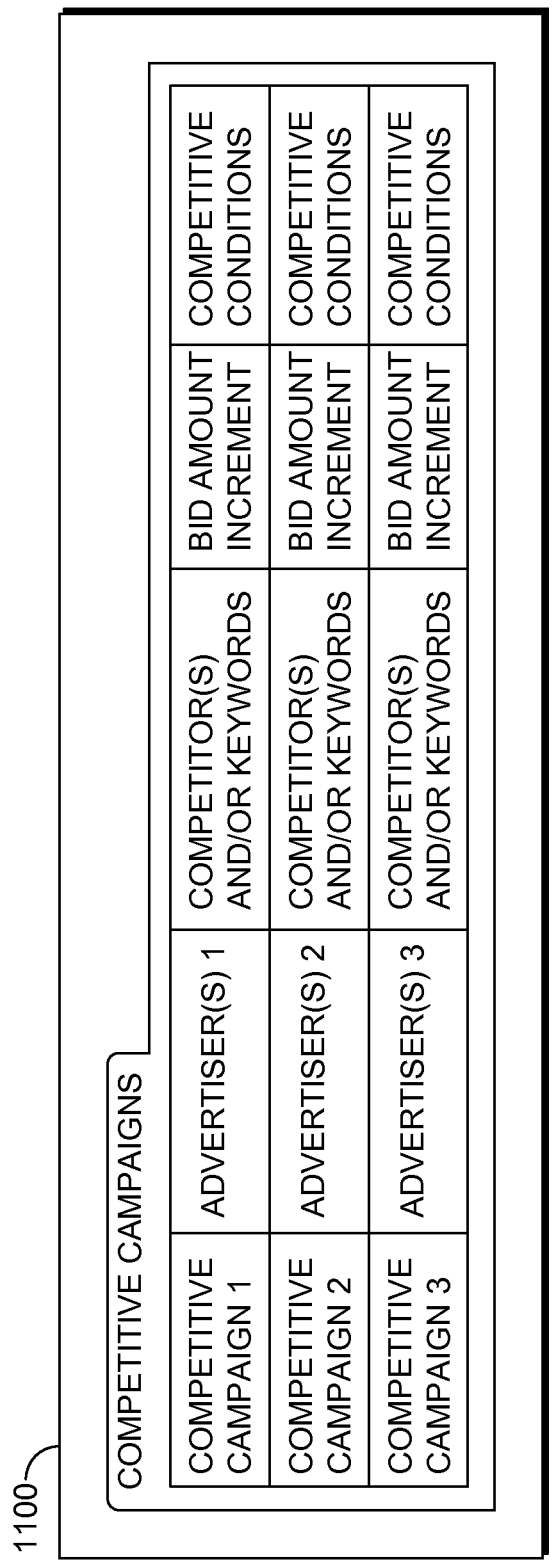
FIG. 11 illustrates a tabular representation of stored competitive campaigns, according to one embodiment.

FIG. 11 illustrates a tabular representation of stored competitive campaigns, according to one embodiment. Depicted is a group of competitive campaigns 1100, as they would be stored by an ad server. Specifically, competitive campaigns 1, 2, and 3 represent different competitive campaigns created by different advertisers. Each competitive campaign may include a competitive campaign name, indication of advertisers creating the competitive campaign, competitors and/or keywords for conditioning or triggering the competitive campaign, current bid amounts and increments for adjusting the bid amounts when competitive conditions are met, and the competitive conditions. In particular, the competitive conditions may be stored as software-based rules (e.g., if-then statements, for and while loops, routines, subroutines, and so on) that identify when particular events occur.

For example, a competitive condition may be set to increment the bid amount of competitive campaign 1 to the amount of a competitor's bid amount if the competitor is chosen by the online auction to be displayed on a web page. In another example, a competitive campaign may be set to substitute one advertisement for another advertisement whenever a competitor's advertisement is being shown. In still another example, a competitive campaign may be set to not bid on ad spaces whenever a competitor's advertisement is selected for display. Competitive conditions may also be set to trigger in different manners for specific time periods (e.g., hours, days, months, and so on). For example, a competitive campaign may be set to not show an advertisement whenever a competitor's advertisement is selected for display from May to August. The aforesaid examples are provided merely for illustrative purposes and are not meant to be an exhaustive list.

Figure 12:
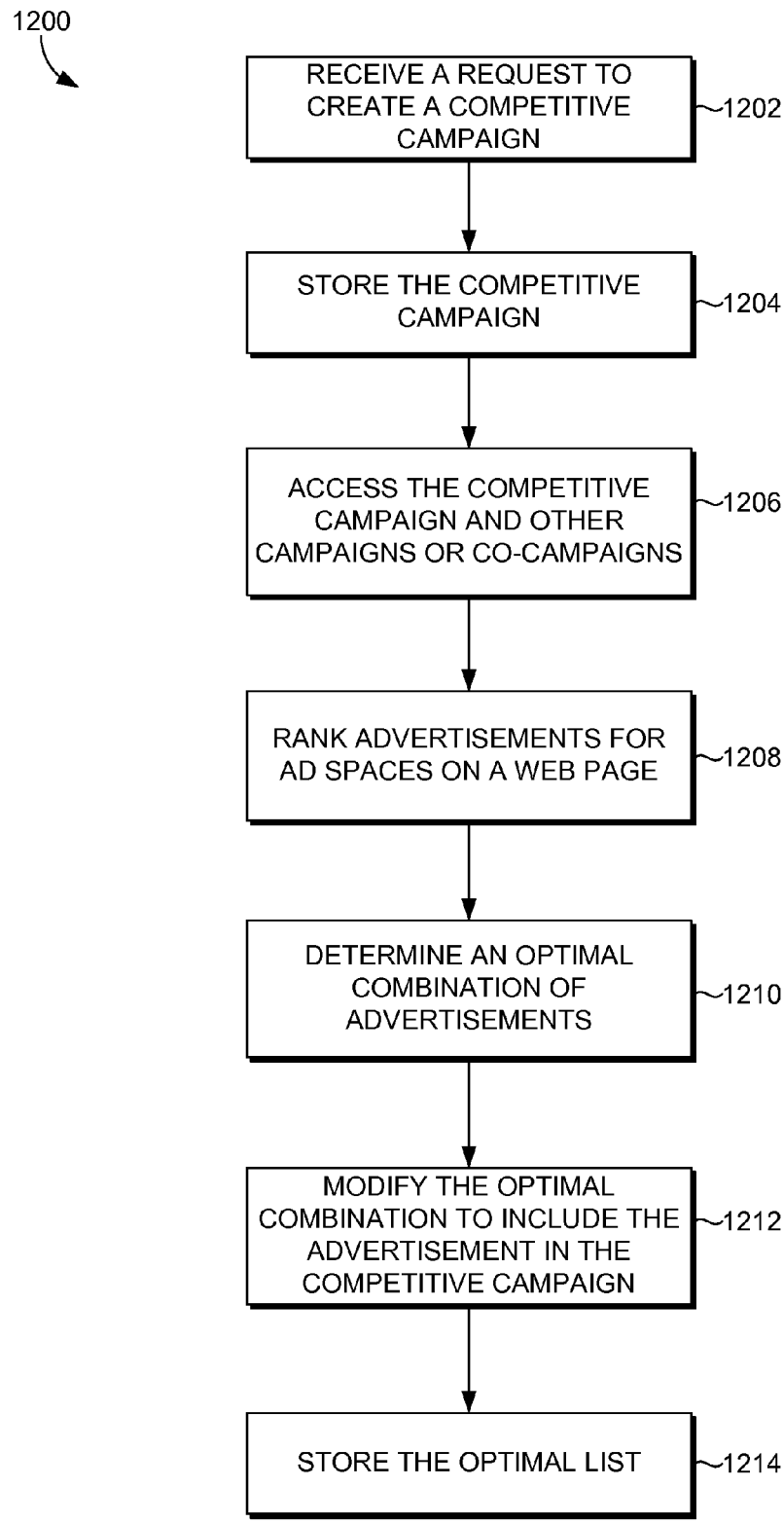
FIG. 12 is a diagram of a flow chart for creating and managing competitive campaigns, according to one embodiment.

FIG. 12 is a diagram of a flow chart for creating and managing competitive campaigns, according to one embodiment. The illustrated embodiment, generally references as flow 1200, initially receives a request from an advertiser trying to create a competitive campaign, as indicated at 1202. The request may include various data associated with the competitive campaign, including competitive campaign name, competitors, bid amounts, and competitive conditions. Such data for the competitive campaign is stored by a campaign server, as indicated at 1204, and can be accessed—along with campaigns and co-campaigns on the campaign server—by an advertisement service looking to populate ad spaces of a loading or instance of a requested web page, as indicated at 1206.

The advertisement service performs various auctions to rank advertisements in associated with the stored campaigns, co-campaigns, or competitive campaigns, as indicated at 1208. In one embodiment, competitive campaigns may be accessed after campaign and co-campaign advertisements are first ranked, and then after the campaign and co-campaign advertisements are ranked, competitive campaigns may be accessed to see if there are any competitors that have not yet been considered.

Ranking may be based on bid amounts, opportunity costs, and/or relevancy factors associated with the advertisements of campaigns, co-campaigns, or competitive campaigns. From the ranking, an optimal combination of advertisements is determined, as indicated at 1210, that will generate, or likely generate when considering opportunity costs, the greatest amount of money for the advertisement service. A secondary auction, or auctions, may also be conducted to determine whether the optimal combination of advertisements should be modified (for instance, by replacing an advertisement in the optimal list with one from a competitive campaign) to generate a better return—whether monetarily based, relevancy-based, or both—for the advertisement service. The optimal combination can be modified accordingly and then stored, as indicated at 1212 and 1214, respectively.

Figure 13:
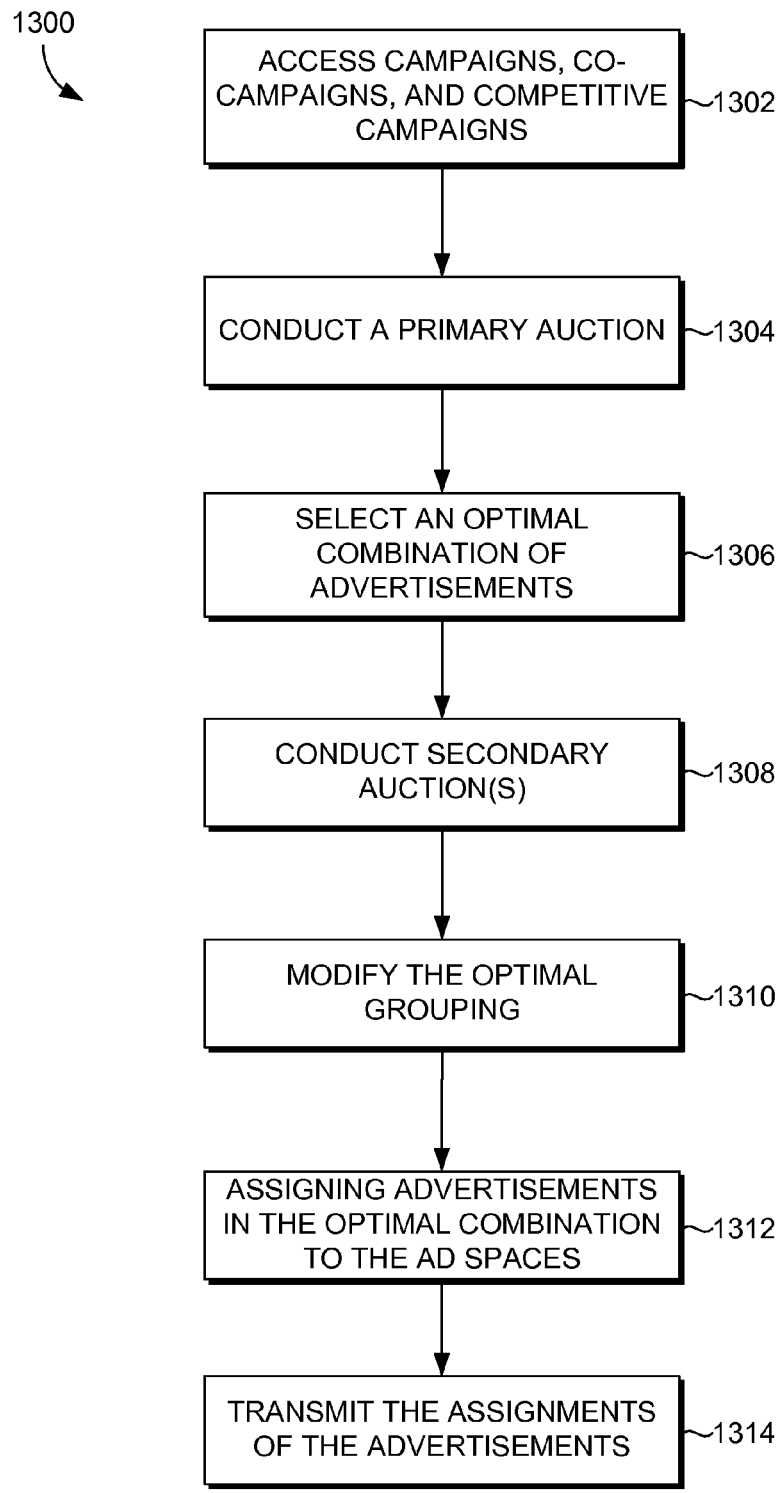
FIG. 13 is a diagram of a flow chart for selecting advertisements from campaigns, co-campaigns, and competitive campaigns, according to one embodiment.

FIG. 13 is a diagram of a flow chart for selecting advertisements to display on a web page, according to one embodiment. The illustrated embodiment, generally references as flow 1300, initiates when an advertisement service accesses campaigns, co-campaigns, and competitive campaigns stored on a campaign server in order to find advertisements to use in populating ad spaces on an instance of a web page, as indicated at 1302. Again, the selection of advertisements is performed by an online auction conducted by the advertisements service, indicated at 1304. The auction will rank advertisements from the campaigns, co-campaigns, and/or competitive campaigns so that the advertisement service can select an optimal combination of advertisements, as indicated at 1306. Subsequent secondary auctions may be also be conducted in order to find the best combination of advertisements for generating money or optimizing relevance, as indicated at 1308 and 1310. Again, secondary auctions, as referred to herein, are additional auctions that select advertisements after the online auction. The secondary auction may include multiple auctions (e.g., 100 secondary auctions), not just one. The resultant advertisements in the optimal group can then be assigned to different ad spaces based on rankings in the primary and secondary auctions, as indicated at 1312. In one embodiment, the final set of advertisements for display will include some advertisements from the first online auction (mentioned above as "the online auction"), modified advertisements from the first online auction, and new advertisements that were included by the secondary auction(s). The assignments of the advertisements to the ad spaces can then be transmitted to a web server hosting the web page, as indicated at 1314, so that the advertisements are placed in the ad spaces when an instance of the web page is rendered to a visitor.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable devices embodied with computer-executable instructions that, when executed by a processor, create and store a competitive campaign, comprising:
    receiving, on an application server, a request submitted by a user to create the competitive campaign, the competitive campaign comprising an identification of an advertiser, at least one competitor of the advertiser, a web advertisement, and conditions that govern display of the web advertisement on a web page, wherein a first condition includes selection of the at least one competitor's advertisement for display on the web page and a second condition includes incrementing a bid amount for the display of the web advertisement on the web page when the first condition is met;
    storing the competitive campaign;
    determining the first condition is met; and
    based on the determination, incrementing the bid amount for the display of the web advertisement on the web page.

2. The one or more devices of claim 1, wherein incrementing the bid amount raises the bid amount associated with the at least one competitor's advertisement.

3. The one or more devices of claim 1, wherein incrementing the bid amount raises the bid amount by a percentage specified by a user.

4. The one or more devices of claim 1, wherein the competitive campaign comprises an indication of a competitor of the advertiser and one or more keywords associated with at least one member of a group comprising a campaign and a co-campaign that includes the competitor of the advertiser.

5. The one or more devices of claim 4, further comprising:
   determining the conditions indicate triggering the competitive campaign because the competitor of the advertiser and the one or more keywords are being used to select a second advertisement for display on the web page; and
   because the conditions indicate triggering the competitive campaign, incrementing a bid amount associated with the web advertisement.

6. The one or more devices of claim 1, further comprising selecting the web advertisement for display on the web page only when the at least one competitor's advertisement is displayed on the web page.

7. The one or more devices of claim 1, further comprising selecting the web advertisement for display on the web page based, at least in part, on the incremented bid amount.

8. The one of more devices of claim 1, wherein a third condition includes selection of the at least one competitor's advertisement for display in a predetermined location on the web page, and wherein the second condition includes incrementing a bid amount for the display of the web advertisement on the web page when the first condition and the third condition are met.

9. The one of more devices of claim 1, wherein a fourth condition includes selection of the at least one competitor's advertisement for display on the web page, and wherein the at least one competitor's advertisement depicts a product that competes with a product depicted in the web advertisement, and wherein the second condition includes incrementing a bid amount for the display of the web advertisement on the web page when the first condition and the fourth condition are met.

* * * * *